US008867844B2

(12) United States Patent
Van Beek et al.

(10) Patent No.: US 8,867,844 B2
(45) Date of Patent: Oct. 21, 2014

(54) EDGE BASED TEMPLATE MATCHING

(75) Inventors: Petrus J. L. Van Beek, Camas, WA (US); Xinyu Xu, Vancouver, WA (US); Chang Yuan, Vancouver, WA (US); Xiao-fan Feng, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 158 days.

(21) Appl. No.: 13/363,861

(22) Filed: Feb. 1, 2012

(65) Prior Publication Data

US 2013/0195365 A1   Aug. 1, 2013

(51) Int. Cl.
*G06K 9/48*   (2006.01)

(52) U.S. Cl.
USPC ........................................................ 382/199

(58) Field of Classification Search
None
See application file for complete search history.

(56) References Cited

U.S. PATENT DOCUMENTS

| | | | | |
|---|---|---|---|---|
| 5,974,168 | A * | 10/1999 | Rushmeier et al. | 382/141 |
| 6,278,796 | B1 | 8/2001 | Drisko et al. | |
| 2002/0164074 | A1 * | 11/2002 | Matsugu et al. | 382/173 |
| 2006/0104508 | A1 * | 5/2006 | Daly et al. | 382/167 |
| 2007/0183667 | A1 * | 8/2007 | Wyatt et al. | 382/201 |
| 2009/0028385 | A1 * | 1/2009 | Cavallaro et al. | 382/103 |
| 2009/0147111 | A1 * | 6/2009 | Litvinov et al. | 348/273 |
| 2010/0098339 | A1 | 4/2010 | Kido | |
| 2010/0225789 | A1 * | 9/2010 | Gheorghe et al. | 348/241 |
| 2011/0110597 | A1 * | 5/2011 | Abe et al. | 382/199 |
| 2011/0268328 | A1 * | 11/2011 | Bar-Aviv et al. | 382/128 |
| 2012/0082385 | A1 * | 4/2012 | Xu et al. | 382/199 |

OTHER PUBLICATIONS

Nayar et al., Separation of Reflection Components Using Color and Polarization, International Journal of Computer Vision, vol. 21, No. 3, 1977, pp. 163-186.
Sato et al., Temporal-Color Space Analysis of Reflection, Journal of the Optical Society, vol. 11, Issue 11, 1994, 7 pgs.
Lin et al., Separation of Diffuse and Specular Reflection in Color Images, Computer Vision and Pattern Recognition, Proceedings of the 2001 Computer Society Conference on Dec. 8-14, 2001, pp. 341-346.
Park et al., Highlight Separation and Surface Orientation for 3-D Specular Objects, 10th International Conference on Pattern Recognition, Jun. 1990, vol. i, pp. 331-335.
Lin et al., Diffuse-Specular Separation and Depth Recovery from Image Sequences, European Conference on Computer Vision, 2002, pp. 210-224.
Klinker et al., The Measurement of Highlights in Color Images, International Journal of Computer Vision, vol. 2, No. 1, 1988, pp. 7-32.
Bajcsy et al., Detection of Diffuse and Specular Interface Reflections and Inter-Reflections by Color Image Segmentation, International Journal of Computer Vision, vol. 17, No. 3, 19967, pp. 241-272.

(Continued)

*Primary Examiner* — Stephen R Koziol
*Assistant Examiner* — Delomia Gilliard
(74) *Attorney, Agent, or Firm* — Chernoff Vilhauer McClung & Stenzel, LLP

(57) ABSTRACT

A method for image processing includes determining edge pixels of a model image and determining features for the edge pixels of the model image. The image processing includes determining edge pixels of an input image and determining features for the edge pixels of the input image. The system matches the features of the model image with the features of the input image to determine candidate locations of an object within the input image.

22 Claims, 25 Drawing Sheets

(56) References Cited

OTHER PUBLICATIONS

Tan et al., Separating Reflection Components of Textured Surfaces Using a Single Image, IEEE Transactions on Pattern Analysis and Machine Intelligence, vol. 27, Issue 2, Feb. 2005, pp. 178-193.

Mallick et al., Beyond Lambert: Reconstructing Specular Surfaces Using Color, Computer Vision and Pattern Recognition, Jun. 2005, vol. 2, pp. 619-626.

Mallick et al., Specularity Removal in Images and Videos: A PDE Approach, European Conference on Computer Vision, 2006, pp. 550-563.

Shen et al., Simple and efficient method for specularity removal in an image, Applied Opitcs, vol. 48, Issue 14, 2009, pp. 2711-2719.

Yang et al., Real-time Specular Highlight Removal Using Bilateral Filtering, European Conference on Computer Vision, 2010, 14 pgs.

Tan et al., Separation of Highlight Reflections on Textured Surfaces, Computer Vision and Pattern Recognition, 2006, pp. 1855-1860.

Tan et al., Reflection Components Decomposition of Textured Surfaces using Linear Basis Functions, Computer Vision and Pattern Recognition, 2005, vol. 1, pp. 125-131.

Tan et al., Highlight Removal by Illumination-Constrained Inpainting, IEEE International Conference on Computer Vision, vol. 1, 2003, 6 pgs.

* cited by examiner

TEMPLATE MATCHING model image   example input image   example output image

| INDEX | ANGULAR RANGE | BIT PATTERN |
|---|---|---|
| 0 | NON-EDGE | 00000000 |
| 1 | -15 to +15 | 00000010 |
| 2 | +15 to +45 | 00000100 |
| 3 | +45 to +75 | 00001000 |
| 4 | +75 to +105 | 00010000 |
| 5 | +105 to +135 | 00100000 |
| 6 | +135 to +165 | 01000000 |
| 7 | NOT USED | 00000000 |

FIG. 8

| INDEX | ANGULAR RANGE | BIT PATTERN |
|---|---|---|
| 0 | NON-EDGE | 00000000 |
| 1 | -15 to +15 | 01000110 |
| 2 | +15 to +45 | 00001110 |
| 3 | +45 to +75 | 00011100 |
| 4 | +75 to +105 | 00111000 |
| 5 | +105 to +135 | 01110000 |
| 6 | +135 to +165 | 01100010 |
| 7 | NOT USED | 00000000 |

FIG. 9

0 DEGREE TEMPLATE

30 DEGREE TEMPLATE

60 DEGREE TEMPLATE

90 DEGREE TEMPLATE

120 DEGREE TEMPLATE

150 DEGREE TEMPLATE

EDGE BASED TEMPLATE MATCHING

CROSS-REFERENCE TO RELATED APPLICATIONS

None.

BACKGROUND OF THE INVENTION

The present invention relates generally to template matching for an image.

Referring to FIG. 1, template matching is a commonly used technique in order to recognize content in an image. The template matching technique includes a given target object in a model image, automatically finding the position, orientation, and scaling of the target object in input images. Generally, the input images undergo geometric transforms (rotation, zoom, etc.) and photometric changes (brightness/contrast changes, blur, noise, etc.). In the context of template matching, the relevant characteristics of the target object in the model image may be assumed to be known before the template matching to the target image is performed. Such characteristics of the target object may be extracted, modeled, and learned previously in a manner that may be considered "off-line," while the matching of those characteristics to the input image may be considered "on-line."

One of the template matching techniques includes feature point based template matching which achieves good matching accuracy. Feature point based template matching extracts object discriminative interesting points and features from the model and the input images. Then those features are matched between the model image and the input image with K-nearest neighbor search or some feature point classification technique. Next a homography transformation is estimated from those matched feature points, which may further be refined.

Feature point based template matching works well when objects contain a sufficient number of interesting feature points. It typically fails to produce a valid homography when the target object in the input or model image contains few or no interesting points (e.g. corners), or the target object is very simple (e.g. target object consists of only edges, like paper clip) or symmetric, or the target object contains repetitive patterns (e.g. machine screw). In these situations, too many ambiguous matches prevents generating a valid homography. To reduce the likelihood of such failure, global information of the object such as edges, contours, or shape may be utilized instead of merely relying on local features.

Another category of template matching is to search the target object by sliding a window of the reference template in a pixel-by-pixel manner, and computing the degree of similarity between them, where the similarity metric is commonly given by correlation or normalized cross correlation. Pixel-by-pixel template matching is very time-consuming and computationally expensive. For an input image of size N×N and the model image of size W×W, the computational complexity is $O(W^2 \times N^2)$, given that the object orientation in both the input and model image is coincident. When searching for an object with arbitrary orientation, one technique is to do template matching with the model image rotated in every possible orientation, which makes the matching scheme far more computationally expensive. To reduce the computation time, coarse-to-fine, multi-resolution template matching may be used.

What is desired therefore is a computationally efficient edge based matching technique.

The foregoing and other objectives, features, and advantages of the invention may be more readily understood upon consideration of the following detailed description of the invention, taken in conjunction with the accompanying drawings.

BRIEF DESCRIPTION OF THE SEVERAL VIEWS OF THE DRAWINGS

FIG. 8 illustrates a bit pattern for different angles.
FIG. 9 illustrates another bit pattern for different angles.

DETAILED DESCRIPTION OF PREFERRED EMBODIMENT

Figure 1:
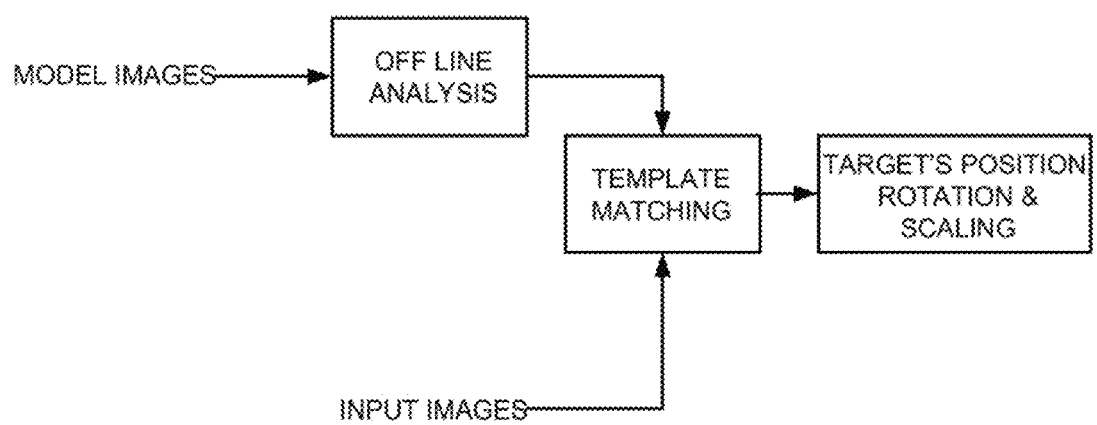
FIG. 1 illustrates template matching.
Figure 2:
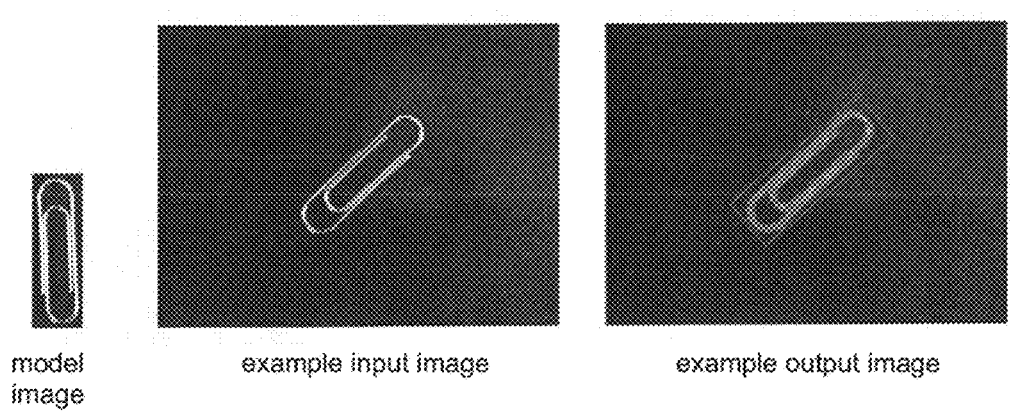
FIG. 2 illustrates a model image, an input image, and an output image.

Referring to FIG. 2, in many cases a model image has a limited set of feature points but tends to have relatively sharp edge features. One such example is a paperclip. Then using a suitable matching technique it is desirable to find a matching object in one or more input images, in a computationally efficient manner. The matching object may be at an unknown position and at an unknown rotation.

Figure 3:
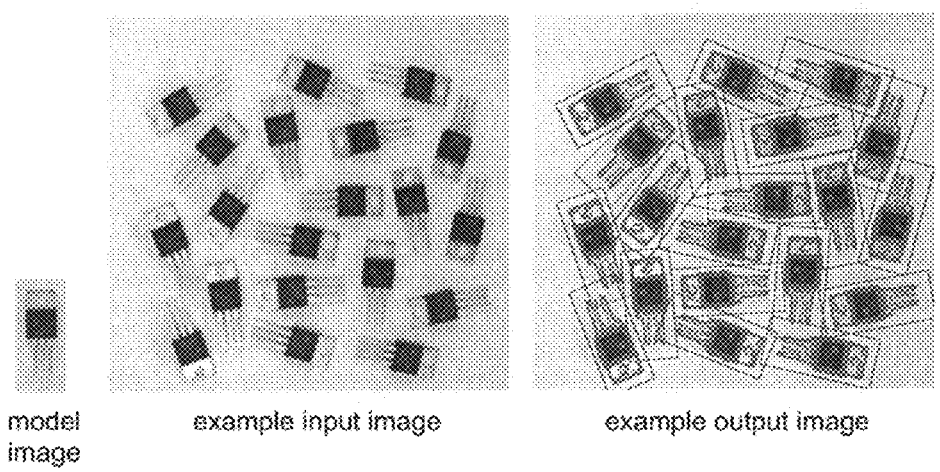
FIG. 3 illustrates another model image, an input image, and an output image.

Referring to FIG. 3, in many cases the input image may have one or more matching objects of interest, which may be overlapping with one another. Then using a suitable matching technique it is desirable to find matching objects in one or more input images, in a computationally efficient manner. The matching objects may be at an unknown position and at an unknown rotation.

Figure 4:
FIG. 4 illustrates another model image, an input image, and an output image.
Figure 4:
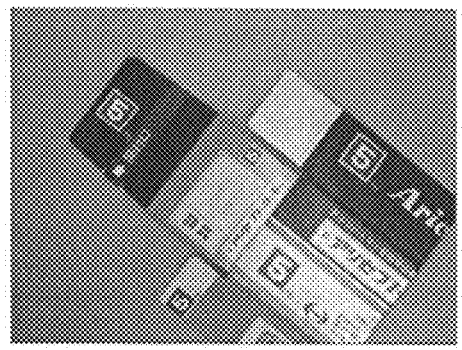
Figure 4:
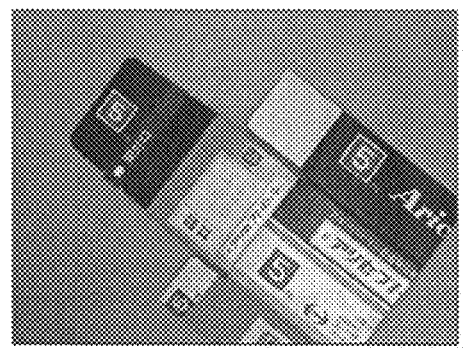

Referring to FIG. 4, in many cases the input image may have one or more matching objects of interest, which may be overlapping with one another. Then using a suitable matching technique it is desirable to find matching objects in one or more input images, in a computationally efficient manner. The matching object may be at an unknown position, unknown rotation, and unknown scale.

Referring again to FIG. 2, FIG. 3, and FIG. 4, the matching technique should be computationally efficient, while being sufficiently robust to distinguish image features such as sharp corners, significant edges, or distinguish images with relatively few such features. Moreover, the matching technique should be sufficiently robust to reduce effects due to lighting or illumination changes in the image, blur in the image, noise in the image, and other imaging imperfections. Also, the matching technique should be sufficiently robust to be tolerant to partial occlusions of the object or missing parts of the object in the input image.

Figure 5:
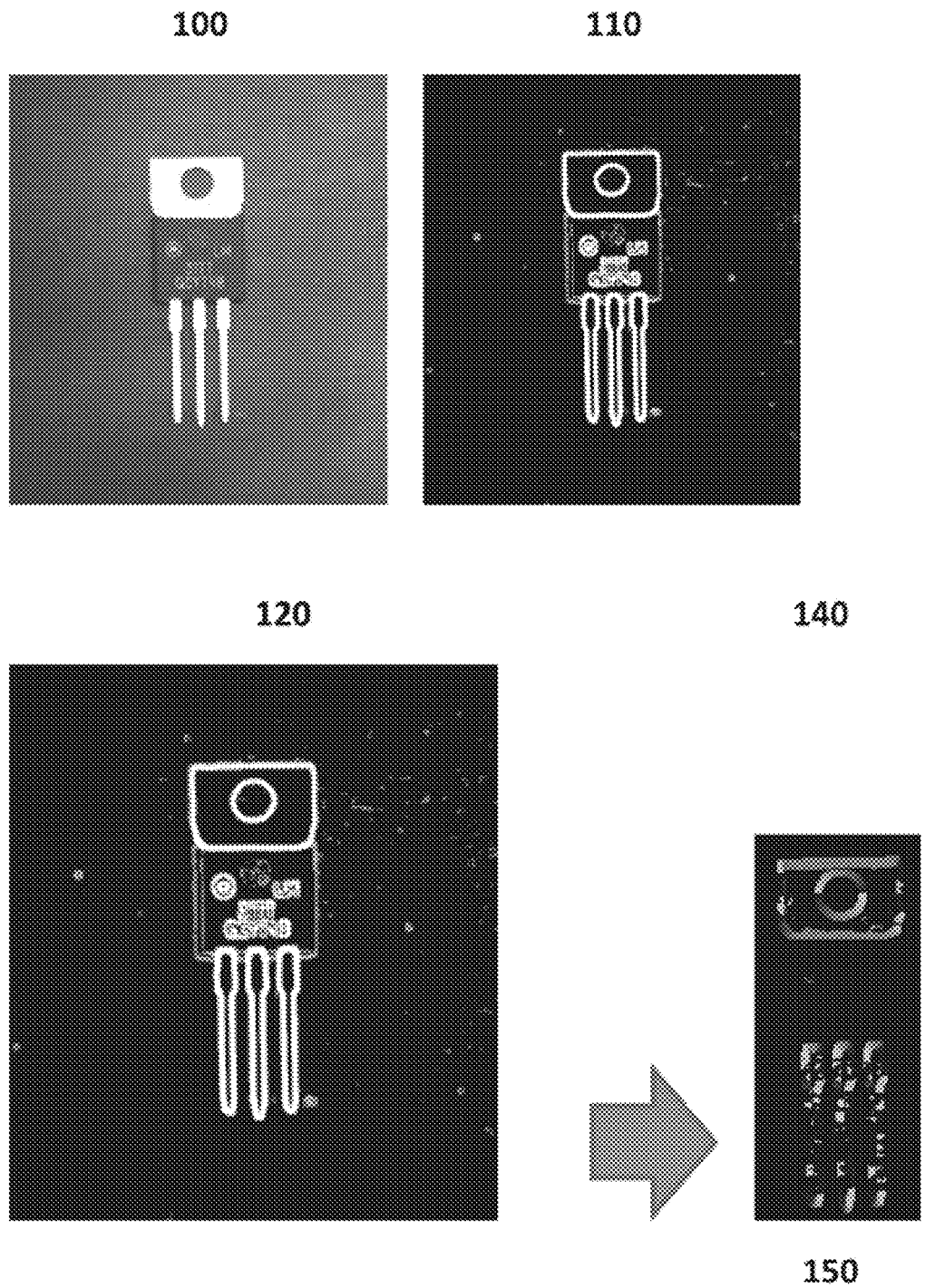
FIG. 5 illustrates an image matching technique.

Referring to FIG. 5, a model image 100 may be received by the system. A preferred technique to determine regions of the model image 100 that are likely to be of interest for image matching is to use an edge based technique 110 to locate edges of the model image. For example, one way to determine the edges 110 is to use a gradient based technique. Edge based techniques are generally robust, generally invariant to lighting changes, generally invariant to illumination changes, generally noise resistant, and generally may be implemented in a computationally efficient manner. For each of the pixels determined to be an edge pixel, the orientation of the edge 120 may be determined. For example, the orientation 120 at each edge pixel may be determined to have an orientation from 0 to 179 degrees (e.g., less than 360 degrees), such as in one degree increments. The orientation may be a full 360 degrees, if desired. The edge orientation 120 therefore preferably includes information regarding the alignment of the edge, but not its particular direction. To increase the invariance of the technique, the edge orientation 120 is preferably defined in a range of generally 180 degrees (e.g., less than 360 degrees). In this manner, the direction of an edge may be either in one direction (e.g., north) or the opposite direction (e.g., south), but the system is agnostic as to which particular direction. This manner of edge orientation characterization results in a system that is more invariant to contrast inversions.

A pixel resolution template 140 may be determined based upon the edge orientations 120. The pixel resolution template 140 may have 180 degrees of angular information at one degree increments (or some other suitable angular increment) at each of the edge pixel locations. Processing input images based only upon the "high resolution" pixel resolution template is computationally inefficient due to the high angular resolution and the high spatial resolution of the pixel resolution template. To increase the computational efficiency of the system, one or more additional quantized angular templates and/or spatial templates based upon the pixel resolution template 140 are preferably utilized.

Figure 6:
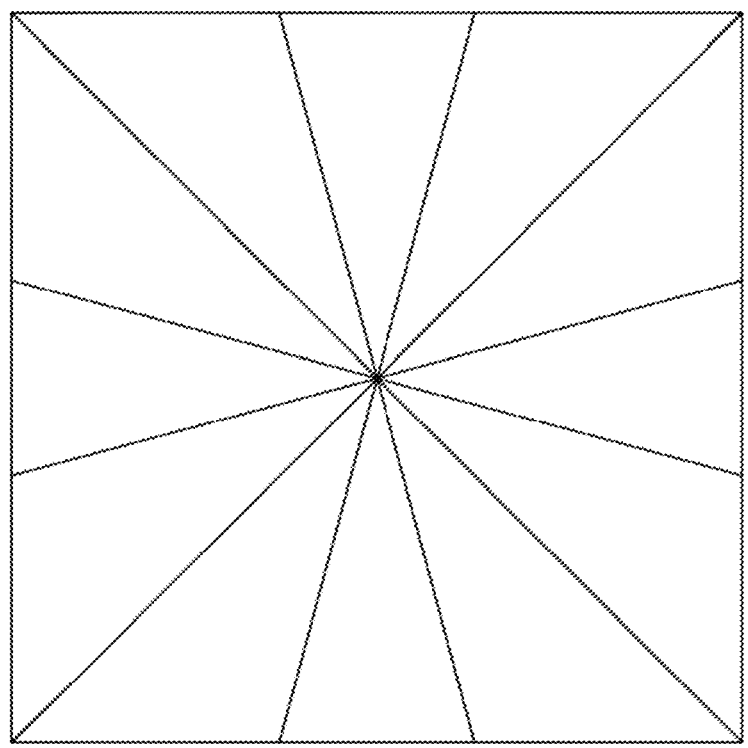
FIG. 6 illustrates a plurality of angular orientations.

Referring to FIG. 6, the edge orientations 120 may be quantized, such as, for example, into one of a set of six orientations, such as −15 to +15 degrees, +15 to +45 degrees, +45 to +75 degrees, +75 to +105 degrees, +105 to +135 degrees, and +135 to +165 degrees. The other opposing six orientations may not need to be determined because the system is preferably directionally invariant. Accordingly, each pixel of the pixel template 140 may be categorized as being within one of the six orientations forming an overall lower angular resolution template 150.

Figure 7:
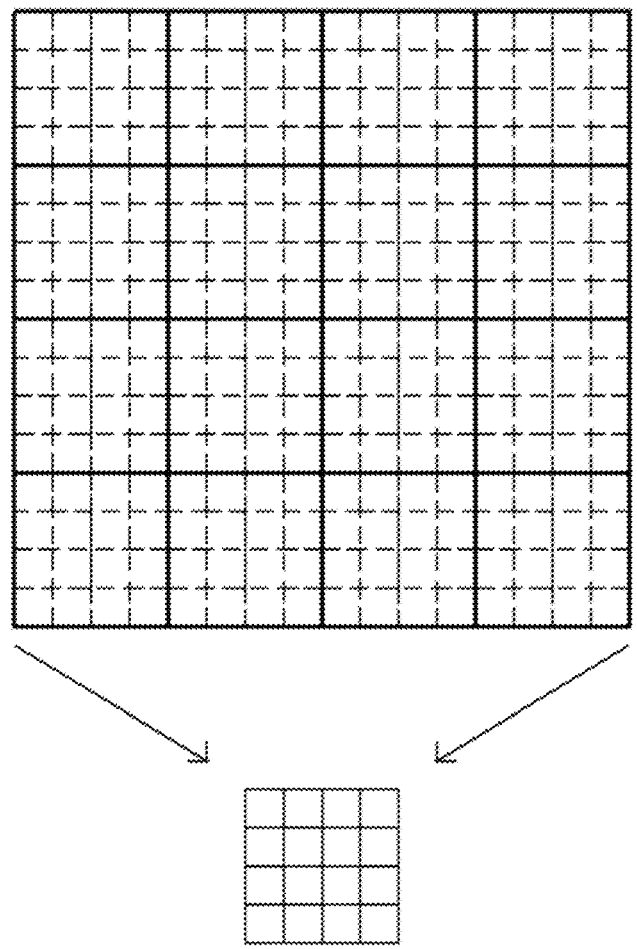
FIG. 7 illustrates pixel blocks of an image.

Referring to FIG. 7, to further increase the computational efficiency of the system, a lower spatial resolution template based upon the lower angular resolution template 150 may be defined by combing groups of pixels, including their angular orientations, into a combined angular direction at a lower resolution. The lower angular resolution template 150 may be modified in a manner to provide lower spatial resolution. For example, each block of 4×4 pixels of the lower angular resolution template may be combined to indicate a single direction and/or multiple directions. For each block of pixels, the frequency of the occurrence of each orientation may be arranged in a rank order. As an alternative, the orientations of the pixels in a block may be arranged in a rank order based on their associated edge strength and/or gradient magnitude. Then the top four occurrences (or other suitable number) of the ranked orientations may be selected as those orientations representative of those in the block. For example, if there are four different orientations then each of them may be selected. For example, if there are three orientations that are the same and a fourth orientation that is different, then the representative orientations may be the two different orientations. Likewise, the edge strength and/or gradient magnitude may be used as a basis for ranking. Other than being used as a basis of ranking to select the orientations, the frequency of the orientations (number of pixels having the same quantized orientation) is preferably not represented in the lower spatial resolution template.

Referring to FIG. 8, to further increase the computational efficiency, the template may be encoded using a set of bytes, with bits of each byte being representative of an angular orientation. For example, the first bit may be representative of a first angular orientation of the six orientations. For example, the second bit may be representative of a second angular orientation of the six orientations. For example, the third bit may be representative of a third angular orientation of the six orientations. For example, the fourth bit may be representative of a fourth angular orientation of the six orientations. For example, the fifth bit may be representative of a fifth angular orientation of the six orientations. For example, the sixth bit may be representative of a sixth angular orientation of the six orientations. As previously noted, the angular orientations are preferably offset from horizontal and vertical, such as −15 degrees to +15 degrees, +15 degrees to +45 degrees, +45 degrees to +75 degrees, +75 degrees to +105 degrees, +105 degrees to +135 degrees, and +135 degrees to +165 degrees. Often the angular orientation of the object within the input image tends to have either vertical and/or horizontal edges, and generally centering those horizontal and/or vertical angular relationships within a range of angles (e.g., −15 to +15) tends to make the system more robust to slight angular modifications. With the potential angular relationships of groups of pixels being represented by bytes, the system can perform computationally efficient pattern matching.

Referring to FIG. 9, in some cases it is desirable to include more robustness in the orientation of the angular determination for a particular pixel to reduce the effects of compared angles being on opposing sides of the quantized angular boundaries. For example, the model image may have an angle of 44 degree (bit pattern 00000100). However, the input image may have a local orientation angle of the same part of the object that was 46 degrees due to noise or other small changes. Then the angle of the input image would be quantized and given a bit pattern of 00001000. The angle codes would not match one another, even though there was only a very small difference in the orientation angle. In such cases with minor variations in the angle, the orientation of the angular determination between an input image and a model template may appear to be significant, while possibly only being different by a couple of degrees (e.g., 44 degrees and 46 degrees). To reduce this likelihood, the bit patterns of the model template may be broadened to include adjoining angular regions. Accordingly, if the bit pattern of the model image was modified to include both sides of the quantized region, namely, 00001110, then the pixel region of the input image having a bit pattern of 00001000 would have overlap and thus be matched. In this manner, the matching would be more robust, although slightly less discriminative. This approach may be refined and extended using additional bit patterns. In particular, a bit pattern may be broadened on only one side of the quantized region, instead of both sides. Furthermore, the decision to broaden a bit pattern may be based on the proximity of the actual orientation angle to the quantization boundary.

Figure 10:
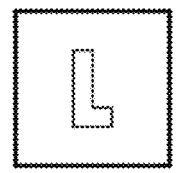
FIG. 10 illustrates a plurality of templates at different rotations.
Figure 10:
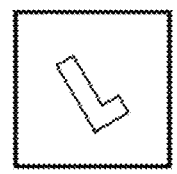
Figure 10:
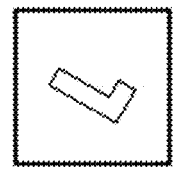
Figure 10:
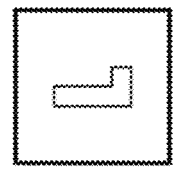
Figure 10:
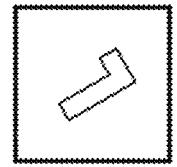
Figure 10:
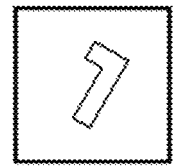

Referring to FIG. 10, to increase the computational efficiency of the system for input images that have objects therein that are at different angular orientations, the model image may be rotated to a plurality of different orientations. The templates are computed at each of the different angular orientations. In this manner, each of the templates for a particular model image may be pre-computed in an efficient manner. For example, the angular positions may include 0 degrees, 30 degrees, 60 degrees, 90 degrees, 120 degrees, and/or 150 degrees. In this manner, an input image to the system to be processed may be compared against a variety of pre-computed lower spatial resolution templates, and in particular, angularly quantized low resolution templates.

Figure 11:
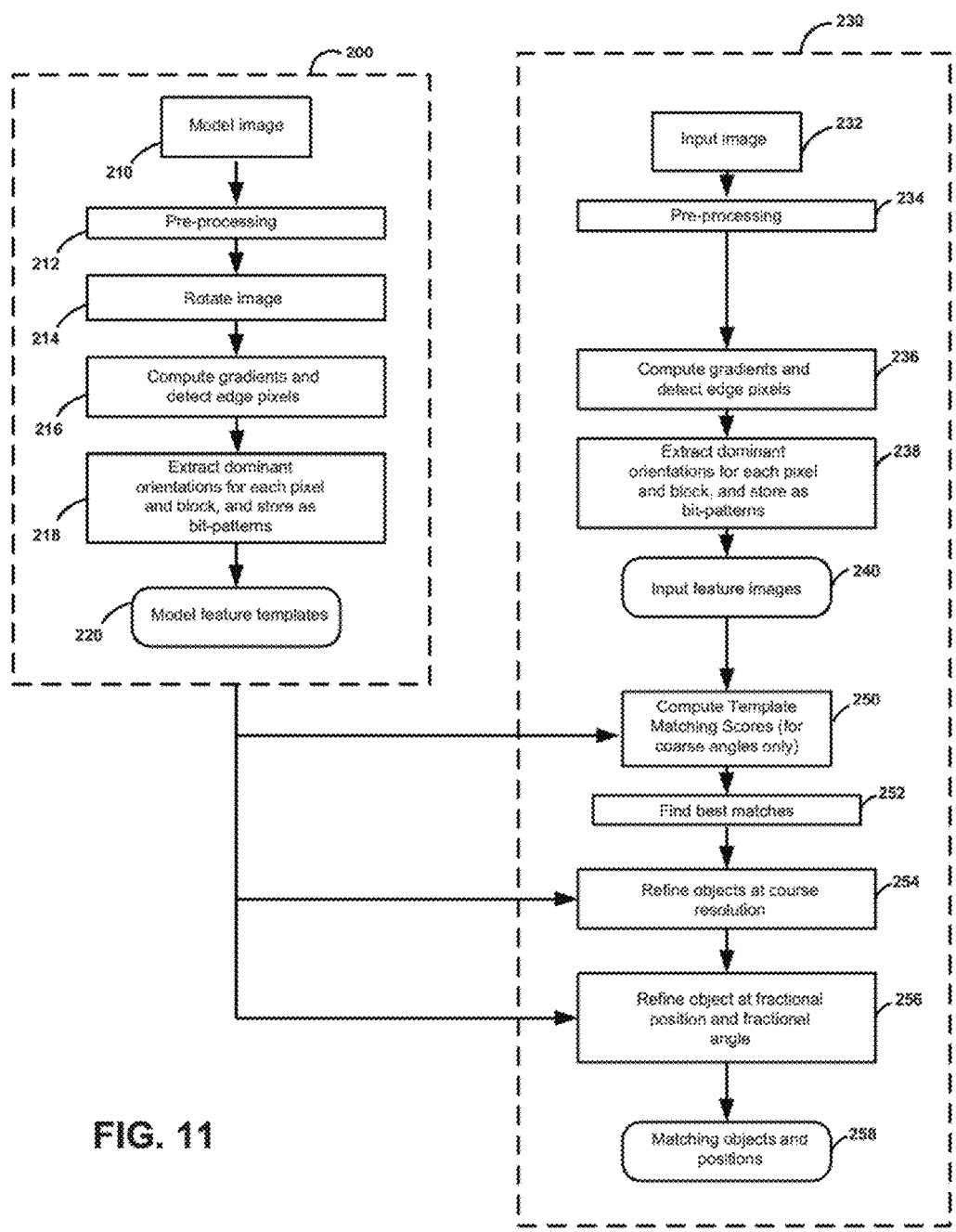
FIG. 11 illustrates an image processing technique for matching.

Referring to FIG. 11, an exemplary model process 200 for a model image 210 and the input image process 230 are shown. The model image 210 may be pre-processed 212 to reduce noise in the image, such as using a low pass filtering operation. The filtered model image 212 may be rotated among a set of orientations, such as by 30 degrees, by a rotation module 214. For each of the set of orientations 214 the system may compute the gradients to identify the edges within the image and determine those pixels of the image corresponding with the edges 216. For each of the set of orientations for which the edges are determined 216, the system may extract the orientations for each pixel and the dominant orientations for blocks of pixels (such as a 4×4 blocks of pixels) and store the result as a set of bytes having suitable bit patterns 218, as previously discussed. In addition, the system may generate a set of full resolution templates at substantially finer angular resolutions, such as rotations of one degree. The result of this process is a set of model feature templates 220.

The exemplary input image process 230 for an input image 232 may include being pre-processed 234 to reduce noise in the image. The system may compute the gradients to identify the edges within the filtered input image and determine those pixels of the image corresponding with the edges 236. For each of the edges that are determined 236, the system may extract 238 the orientations for each pixel and the dominant orientations for blocks of pixels (such as a 4×4 blocks of pixels) and store the result as a set of bytes having suitable bit patterns 240, as previously discussed. The system may likewise compute a full resolution input feature images. The result of this process is input feature images 240.

The system may compute template matching scores 250 between the input feature images 240 and each of the coarse rotations of the model feature templates 220 for different regions of the input image 232. These comparison templates are preferably based upon the byte representation of the respective images, as previously discussed. For example, the system may process the templates centered at each pixel or block of pixels of the input image or otherwise in any other suitable manner. A set of matches 252, preferably those with the highest scores, between the input feature images and the template is determined in any suitable manner.

The result of the matches 252 provides initial candidate locations in the input image that are likely to include an object of interest and also provide rough angular orientations of the objects of interest. The system then refines 254 the angular orientation of each of the objects of interest in the input image by using the course resolution model image at its finer angular resolutions to determine a finer angular estimation. In addition, the system may refine 254 the spatial location of each of the objects of interest in the input image by using the coarse resolution model image at its finer angular resolution. The input feature images may use a higher resolution and/or finer angular resolution, if desired. A set of refined matches between the input feature images and the template is determined in a suitable manner.

The use of a two-stage matching process is computationally more efficient than a one-stage process. The first stage provides a rough estimation of the location of potential objects of interest in the input image, in an efficient manner. The second stage provides a finer estimation of the location of the identified potential objects of interest in the input image, in an efficient manner, by reducing the area of the search and the angular range of the search.

The result of the matching refinement 254 may be provided to a fractional refinement process 256. The fractional refinement process 256 may include an angular search and/or a spatial search using the "full resolution" model image. Also, the fractional refinement process 256 may refine the angular orientation of the objects of interest in the input image by using the "full resolution" model image at angles interpolated in some manner between its finer angular resolutions to determine a fractional angular estimation. In addition, the fractional refinement process 256 may refine the spatial location of the objects of interest in the input image by using the "full resolution" model image at its finer angular resolution and/or fractional angle at positions interpolated in some manner. The input feature images may use a higher resolution and/or finer angular resolution template, if desired. A set of further refined matches 258 is determined in a suitable manner.

The use of a three-stage matching process is computationally more efficient than a one-stage or two-stage process. The first stage provides a rough estimation of the location of potential objects of interest in the input image, in an efficient manner. The second stage provides a finer estimation of the location of the identified potential objects of interest in the input image, in an efficient manner, by reducing the angular range of the search. The third stage provides a reduced spatial and/or angular search together with a sub-angular and/or sub-pixel resolution which provides a finer estimation of the location of the identified potential objects of interest in the input image, in an efficient manner.

Figure 12:
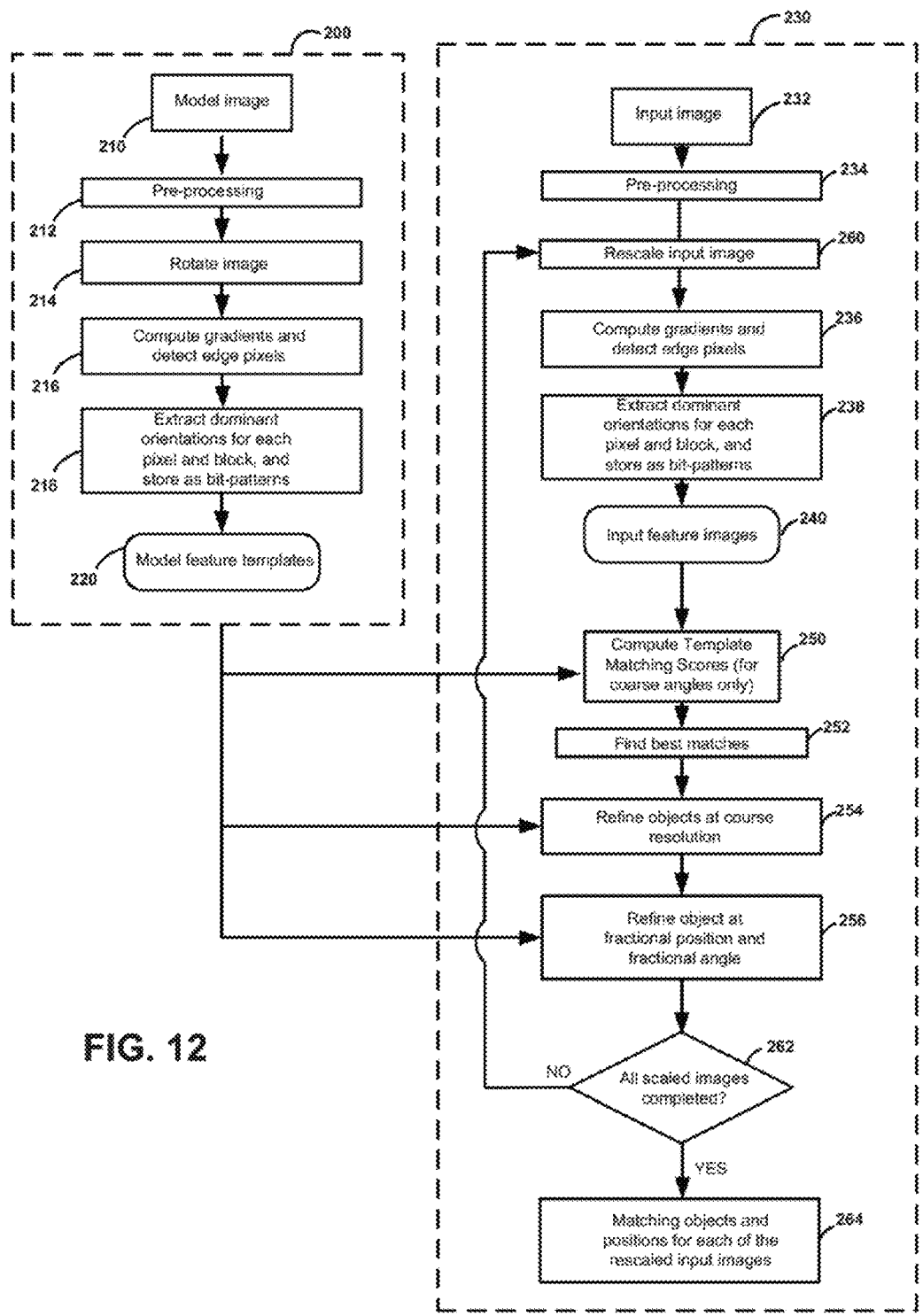
FIG. 12 illustrates an image processing technique for matching that includes scaling.

Referring to FIG. 12, in some cases it may be desirable to provide the ability to more accurately match the model image to the objects in the input image having different scales. The model feature templates are preferably determined at a single scale. The input feature images are preferably determined at a plurality of scales, which is more memory efficient than storing the model image at a plurality of scales. The system may rescale 260 the input image 232 to a different scale. Thereafter, a set of templates and object matching is performed on the rescaled input image 260. The system determines if all scaled images are completed 262, which if not, then the system rescales the input image 260 to a different scale. Generally duplicate matches may be omitted, if desired. When the system determines that all scaled images are completed 262, then the system provides the matching objects and positions for each of the rescaled input images 264 which may be mapped back to the input image resolution.

Figure 13:
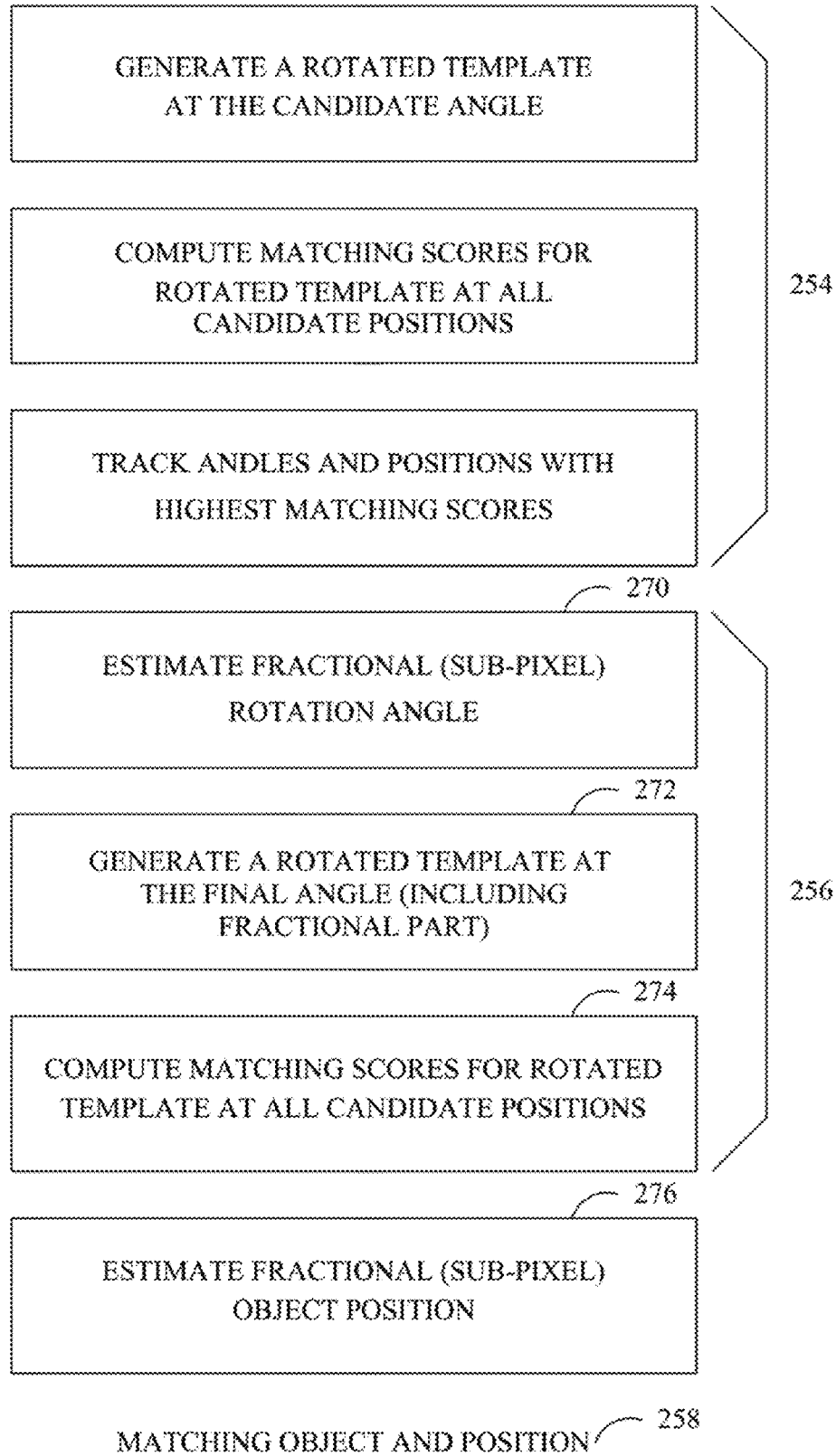
FIG. 13 illustrates a refinement technique for image matching.

Referring to FIG. 13, a more detailed illustration of the refine objects at full resolution process 254 and the refine object at fractional position and fractional angle process 256 are shown. The refine objects at full resolution process 254 may use a set of candidate angles in a local range around the current angle candidate and a set of candidate positions in a local rage around the current position. The angles and positions with the highest matching scores may be tracked. The refine object at fractional position and fractional angle process 256 may estimate a fractional sub-degree rotation angle 270, generate a rotated template at the estimated fractional rotation angle 272, compute matching scores for the rotated template at all candidate positions 274, and estimate fractional sub-pixel object position 276, to provide the object angle and position 258.

Figure 14:
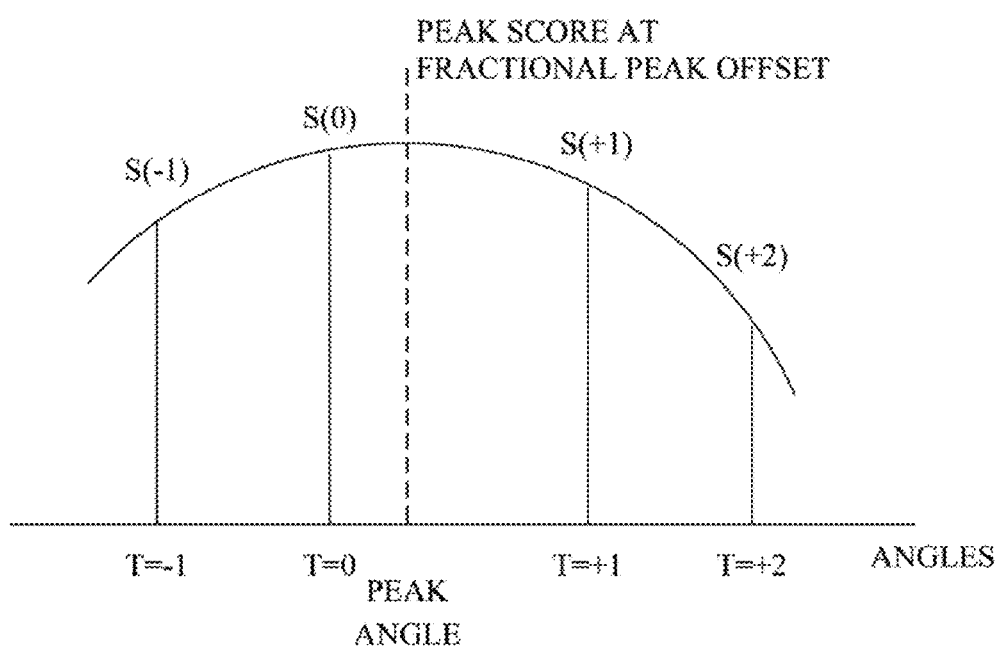
FIG. 14 illustrates a fractional peak offset.

Referring to FIG. 14, one technique for estimating the fractional rotational offset is to assume that the peak score values locally behave as a quadratic function of the rotation angle. The peak scores at a set of discrete angles may be determined (e.g., s(−1), s(0), s(1)). The peak score may be estimated as $\{s(-1)-s(1)\}/2\{s(-1)+s(1)-2*s(0)\}$.

The sub-pixel refinement 256 may be performed in any suitable manner. Often the input to the sub-pixel refinement 256 is a score at each pixel and the location of a peak value. Thus the refinement technique may be based on a local score map around the coarse peak point.

A Barycentric weighting technique may use the score map values to weight each pixel in the local window to obtain the centroid of the neighborhood around the peak value. The Barycentric weighting technique is computationally efficient although tends to be limited to a linear fitting. This may be represented as:

$$x_c = \frac{\sum_i (x_i s_i)}{\sum_i x_i}$$

$$y_c = \frac{\sum_i (y_i s_i)}{\sum_i y_i}$$

A quadratic curve fitting technique fits a bi-quadratic curve to the pixels in the local window around the peak points. This uses a second order fitting which includes a least squares estimation of the error and produces two sets of three coefficients that may be used to reconstruct the curve and find the maximum. This fitting process may be improved by solving the linear equation sets by Hessian matrix and first order derivative. The result is the sub-pixel offset of the maximal point. Without lose of generality, the coarse peak point may be located at (0,0), which is the center of the local window of the score used for refinement. The model for the refinement may be:

$$f(x, y) = ax^2 + by^2 + cxy + dx + ey + g$$

Where $$\frac{a^2 f}{a^2 x} = a \quad \frac{af}{ax} = 2ax + cy + d$$

$$\frac{a^2 f}{a^2 y} = b \quad \frac{af}{ay} = 2by + cx + e$$

The first order of x and y should be 0 at the peak point, then the equation set as follows as:

$$\begin{bmatrix} 2a & c \\ c & 2b \end{bmatrix} \begin{bmatrix} x \\ y \end{bmatrix} = -\begin{bmatrix} d \\ e \end{bmatrix}$$

The system may use the first and second derivative at the coarse peak point to approximate the coefficients a, b, c, d, and e to get the solution of x and y, which is the sub-pixel shift.

A Gaussian fitting technique may be used, such as using a two dimensional Gaussian plane model. The data in the score map is presumed to have a normal distribution. The system may use the first and second derivative at the coarse peak point to approximate the coefficients a, b, c, d, and e to get the solution of x and y, which is the sub-pixel shift. The Gaussian fitting may be represented as:

$$G(x, y) = \frac{1}{2\pi\sigma_x\sigma_y} g^{-\left(\frac{(x-\mu_x)^2}{2\sigma_x^2}\right) + \left(\frac{(y-\mu_y)^2}{2\sigma_y^2}\right)}$$

The fitting objective is to find the proper $\sigma_x$, $\sigma_y$, $\mu_x$, $\mu_y$ to estimate the non-grid value. The $\mu_x$, $\mu_y$ are the results for Gaussian sub-pixel refinement. The fit procedure may use the Levenberg-Marquardt optimization technique for the local window.

The feature matching techniques of the system may be improved by identifying particular regions of the image that should be searched and/or otherwise particular regions of the image that should not be searched. The coarse searching requires a significant amount of computational time and a more computationally efficient initial matching criteria may be used to decrease the processing time of the subsequent coarse matching technique.

Figure 15:
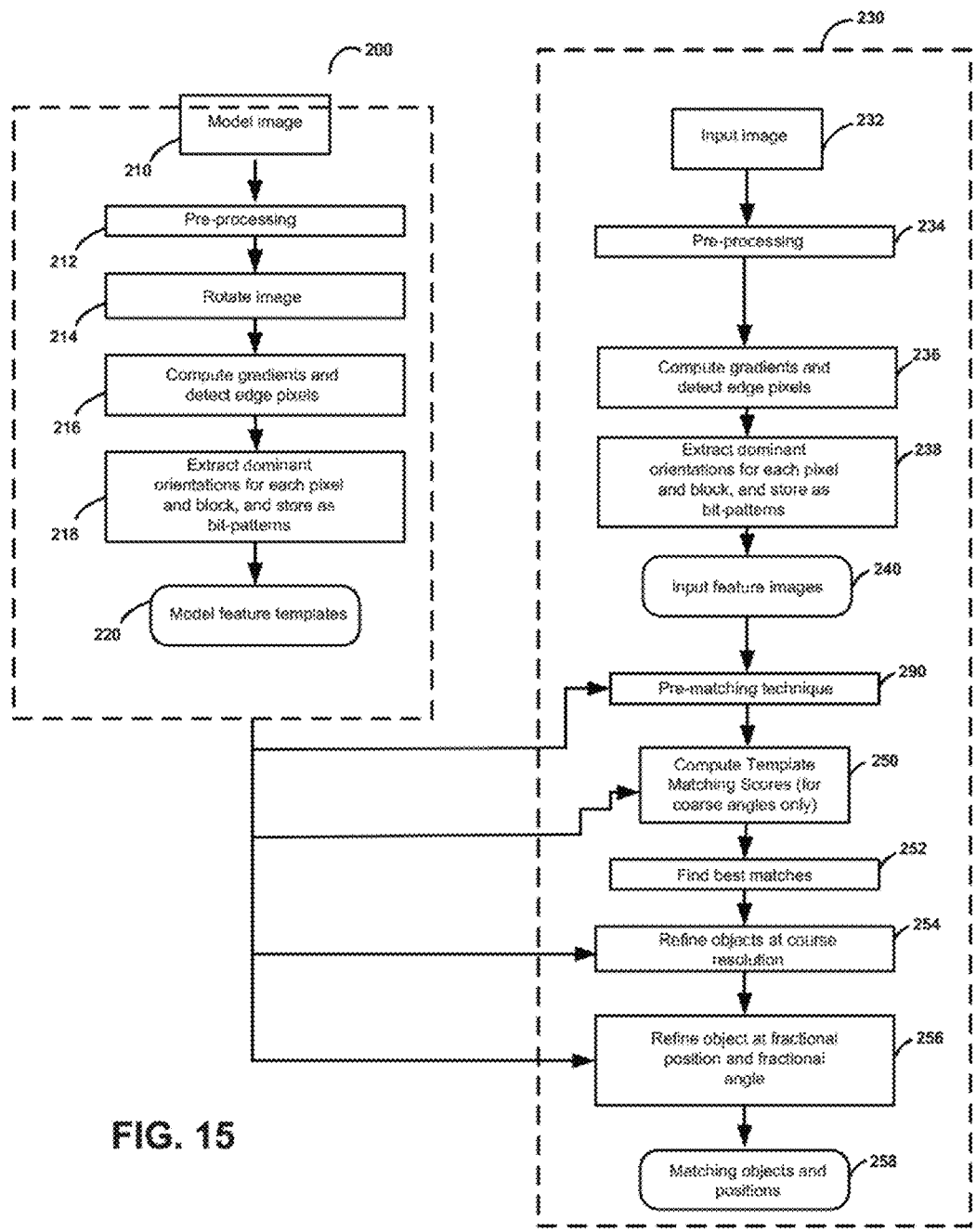
FIG. 15 illustrates an image processing technique for matching that includes pre-filtering.

Referring to FIG. 15, a pre-matching technique 290 may use those pixels identified as edge pixels to do an initial screening of areas of the input image. Pixels not identified as being part of an edge may be omitted as not being likely to be an object in the input image. Thus, the system primarily only performs a matching on the non-zero edge pixels. Thus, the matching technique may indicate candidate positions that are very unlikely to result in a good match, and thus may be skipped. Accordingly, positions that are likely to result in at least a reasonable match are considered in the coarse search stage. The pre-matching technique 290 may determine if the number of edge pixels in the model template is relatively close to the number of edge pixels within the potential object area in the input image. Due to the likelihood of some occlusions or partial objects, the input edge pixel count may at times tend to be smaller than the model edge pixel count. Accordingly, one suitable criteria could for the pre-matching technique 290 is as follows: input edge pixel count>=model edge pixel count*ratio. As it may be appreciated, the edge pixel count is a feature that is computationally efficient to determine and tends to be rotationally invariant. The result is a mask image that defines those regions that meet the pre-matching technique 290 criteria, thus reducing those regions of the image that should be matched during subsequent more computationally intensive processing.

In some cases, it may be more computationally efficient to perform the matching techniques at multiple down sampled resolutions. For example, the matching may be performed at image resolutions down sampled initially at a 4×4 block resolution. A threshold may be applied to the result to further reduce the regions to be searched. Then those areas of potential matching the matching may be performed at image resolutions down sampled at 2×2 block resolutions. Also, a threshold may be applied to the result to further reduce the regions to be searched. In this manner, the coarse template matching may be performed in a computationally efficient manner. Downsampling the feature image may be performed very efficiently using bitwise operations. For example, the bitwise OR operation may be used to combine bit pattners corresponding to feature values of pixels in a 2×2 area.

In some cases, it is desirable to use a modified set of angular orientations for the search, rather than, 0 degrees, 30 degrees, 60 degrees, 90 degrees, 120 degrees, and/or 150 degrees. The selected spacing between the different orientations is preferably sufficiently small enough that the search technique does not miss a match, but likewise sufficiently large enough to make the matching technique computationally efficient. This determination may be based upon an auto-correlation between the original template and the rotated templates. The coarse angle search step may be selected based on the width of the main peak in the auto-correlation function. Computing and analyzing the rotational auto-correlation of the templates may be performed during an off-line stage. This enables adaptation of the angle search step to the specific object, such that the processing time is reduced for various objects.

Figure 16:
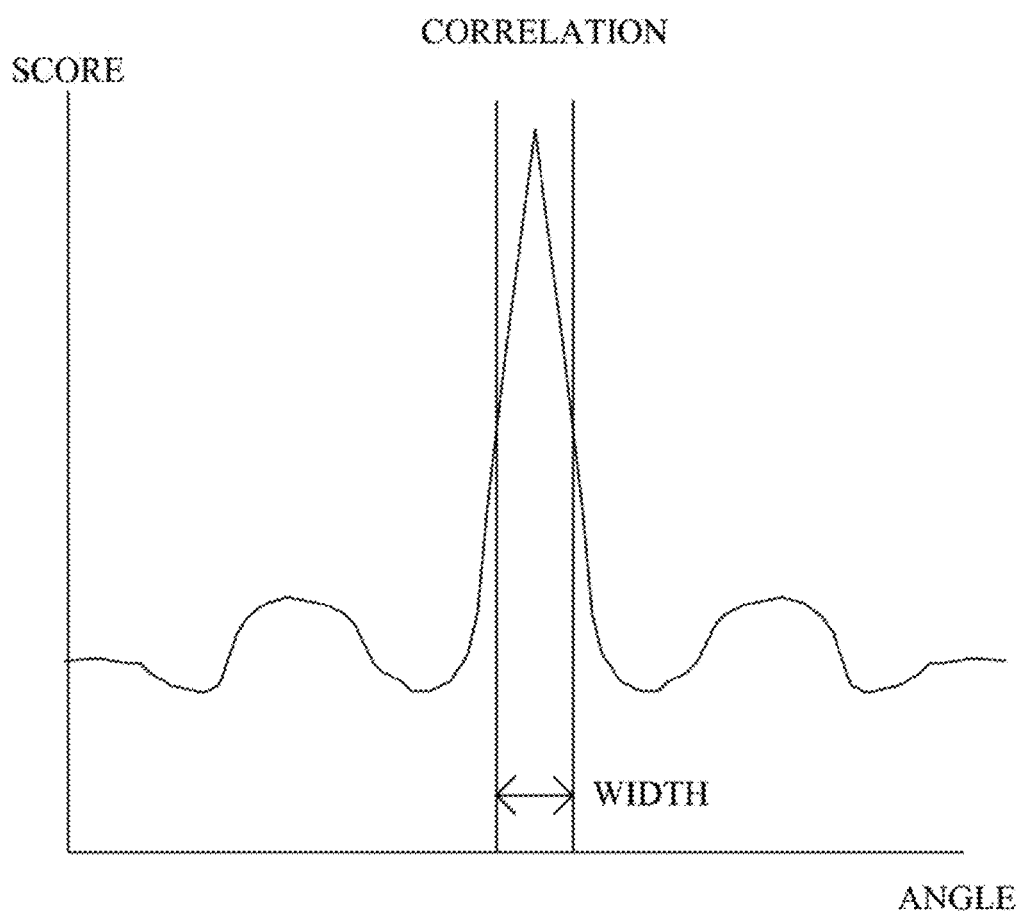
FIG. 16 illustrates a correction of different angles together with a threshold.

Referring to FIG. 16, an exemplary correlation graph is shown as a function of angular degree. It may be observed by selecting a sufficiently small range ensures that the peak will be determined. In contrast, if a sufficiently large range is selected then one or more of the minor peaks may be inadvertently selected.

In many cases, model images have sufficient symmetry that the system should employ a technique that only searches a range of approximately 180 degrees. The model image may be analyzed to determine if it is sufficiently symmetrical in some manner to be suitable for using a symmetrical technique. In the event the model image is not symmetrical, then a technique using generally a full 360 degree search range may be used. The analysis of symmetry of the object in the model image may be based on the auto-correlation of the model template. This analysis may be performed in an off-line stage. Searching a range of approximately 180 degrees during the coarse template matching stage reduces processing time, compared to searching a full range of 360 degrees. In some cases, the analysis may indicate that an object has more symmetry, such as 3 or 4 fold symmetry. In such cases, the search range may be reduced further below 180 degrees.

In some cases it is desirable to do a coarse matching technique followed by a refined matching technique. Then it is desirable to perform another refined matching technique in the opposite direction, such as at 180 degrees from the results of the first matching technique. Thereafter, the orientation with the better matching may be used for the sub-pixel sub-angular further matching refinement. For example, in the case that a reduced angular search is performed in a range of approximately 180 degrees instead of 360 degrees, it is desirable to perform an additional refinement stage in a small angle range around the angle 180 degrees opposite of the first refinement result.

Figure 17:
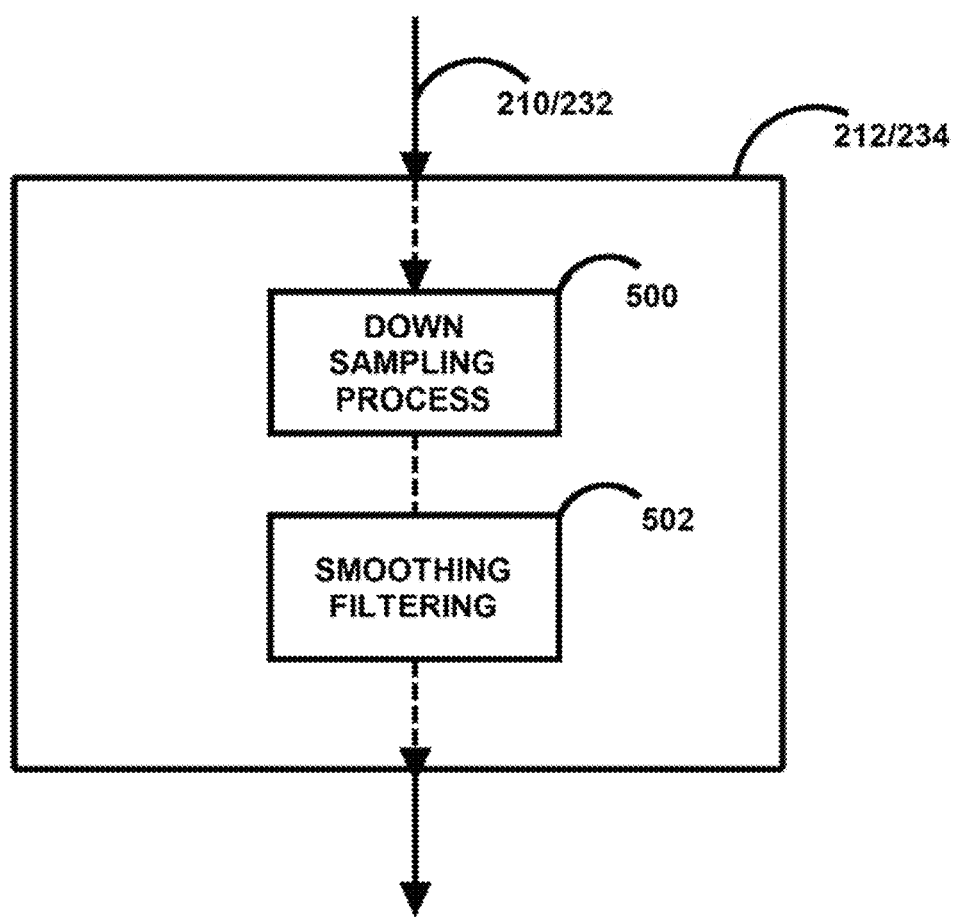
FIG. 17 illustrates a pre-processing operation.

The pre-processing process 212 for the model image 210 and/or the pre-processing process 234 for the input image 232 may be based upon the content of the model image 210 and/or the input image 232 to increase object matching performance. Referring to FIG. 17, the pre-processing process 212/234 may include a down-sampling process 500 suitable for reducing the computational complexity of the system while also being performed in a manner suitable so that the resulting object matching performance is not substantially degraded. In general, an image with lower frequency content is suitable to be down sampled to a greater extent than an image with higher frequency content, while still maintaining suitable object matching performance. By way of example, the down-sampling process 500 may be based on repeated filtering and sub-sampling using suitable filter kernels. The filter kernel may be, for example, a Gaussian based kernel using a sub-sampling factor of 2. The sub-sampling process may be repeated to achieve down-sampling factors of 2, 4, 8, etc. The filter kernel may similarly be based upon other re-sampling (interpolation and/or decimation) filters. The filter kernel may be a uniform filter or an averaging filter. For example, by averaging over a block of S×S pixels and replacing the block by its average, a sub-sampling by a factor of S may be achieved. For example, S may be 2, 3, 4, 5, etc. Also, the down-sampling process may be based upon non-integer down-sampling factors. Also, the filter kernel may be based on wavelet, sub-band, or other multi-resolution decomposition techniques.

The down-sampling process 500 may further include a non-linear technique. For example, given an orientation image with local edge orientation pixel values, a lower-resolution version may be obtained by combining edge orientation pixel values across a block, such as a 4×4 block. The size of the block may be modified such as increasing the size of the block to further reduce the computational complexity. The down-sampling factor is preferably automatically selected by the system.

One technique to automatically select the down-sampling factor may be based upon the object model size. The object model size may be determined by the width and/or the height and/or the region-of-interest of the model image and/or other characteristics.

Figure 18:
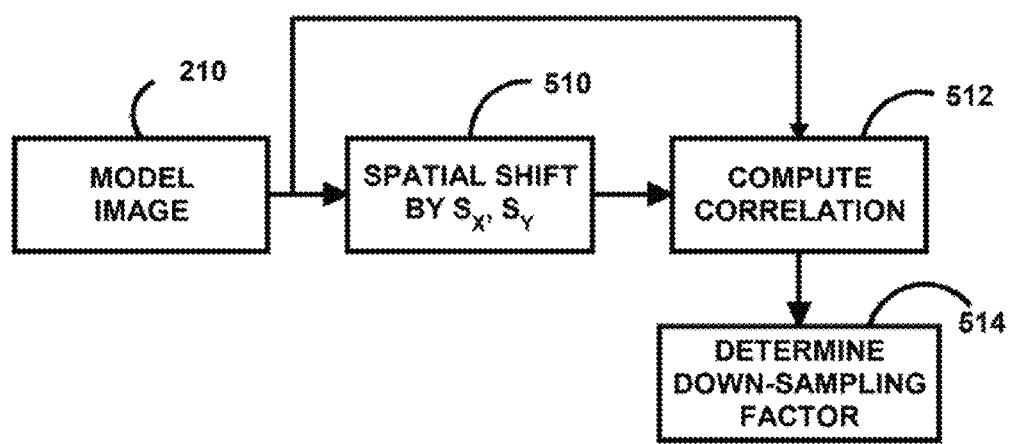
FIG. 18 illustrates a down-sampling process.

Another technique to automatically select the down-sampling factor may be based upon a measure of the auto-correlation of the object model image. The auto-correlation of an image generally relates to the frequency content of the image. A high auto-correlation generally relates to low frequency content while a low auto-correlation generally relates to high frequency content. For example, the correlation of the object model image may be based upon a shifted version of itself. Referring to FIG. 18, one technique to determine the auto-correlation is to shift the object model image 210 by a spatial shift of Sx, Sy 510. The resulting shifted model image 510 and the object model image 210 are correlated with one another 512. The resulting correlation 512 is used to determine a down-sampling factor 514. The greater the auto-correlation, the greater the suitable down-sampling factor tends to be.

Figure 19:
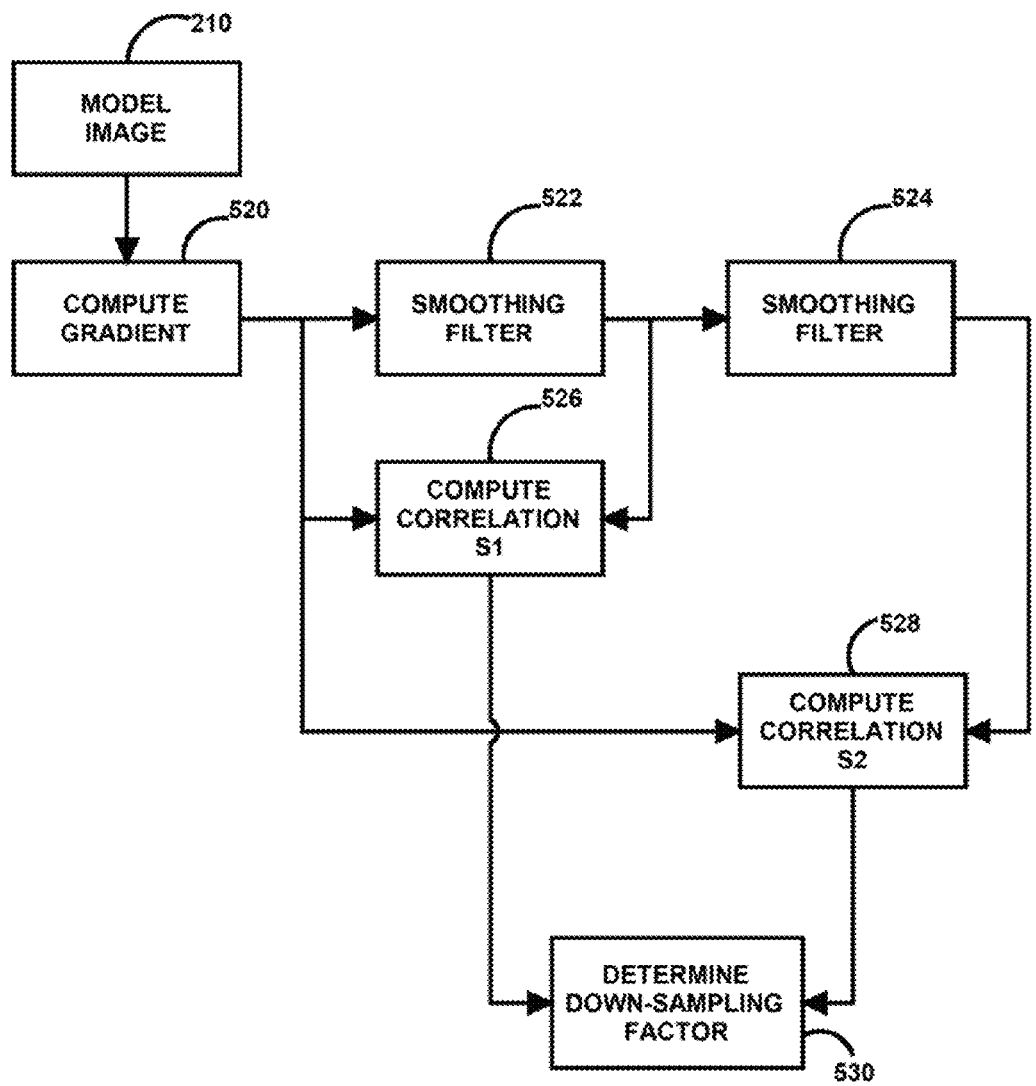
FIG. 19 illustrates another down-sampling process.

Another technique to automatically select the down-sampling factor may be based upon a measure of the auto-correlation of the object model image together with a filter. For example, the correlation of the object model image may be based upon a filtered version of itself. Referring to FIG. 19, one technique to determine the auto-correlation is to identify the edge regions of the object model image 210 by computing its gradient 520 or other measure of higher frequency aspects of the image. The resulting gradient 520 may be filtered by a first smoothing filter 522 to determine a first image with a first level of smoothness. The result of the first smoothing filter 522 is filtered by a second smoothing filter 524 to determine a second image with a second level of smoothness. A first correlation S1 526 is determined based upon the gradient 520 and the output of the first smoothing filter 522. A second correlation S2 528 is determined based upon the gradient 520 and the output of the second smoothing filter 524. A downsampling factor 530 may be determined based upon the first correlation S1 526 and the second correlation S2 528. Accordingly, to the extent that the gradient of the image may be increasingly smoothed while maintaining a sufficiently high auto-correlation tends to indicate lower frequency image content and the suitability for a greater down-sampling factor.

In some embodiments, the auto-correlation may be based upon the object model's gray-level image, color image, gradient image, and/or edge image. The measure of the correlation may be based upon, for example, normalized cross-correlation or mean square differences. Selecting the down-sampling factor may be based upon, for example, a look up table or thresholds. Such thresholds may be based, for example, upon the size of the model object image. In general, a high correlation measure indicates a larger down sampling factor may be selected, while a smaller correlation measure indicates a smaller down sampling factor may be selected.

The pre-processing 212/234 may include one or more smoothing filters 502 that are preferably designed to reduce the undesirable noise in the image while not excessively smoothing desirable image features, such as object edges. The smoothing filter preferably selects its parameters automatically in a manner that reduces such noise while retaining relevant image features and details, such as object edges and contours.

Figure 20:
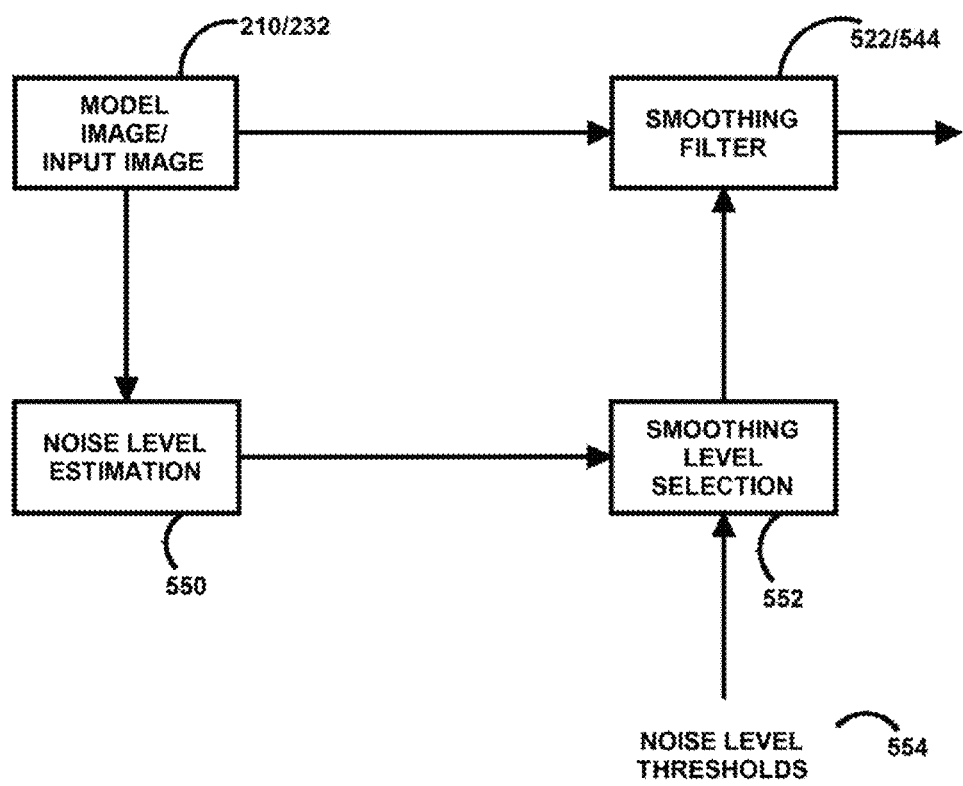
FIG. 20 illustrates a smoothing filter selection process.

Referring to FIG. 20, one technique to select smoothing filter parameters includes two principal aspects. The model image or input image 210 (or down-sampled version) is received by a noise level estimation process 550 which is used for selection of a smoothing level 552. The noise level estimation process 550 may be based upon local pixel differences, such as for example, differences between a selected pixel value and pixel values of neighboring pixels. Such differences may be accumulated over regions in the image to form an estimate of a global noise statistic, such as a global variance or global standard deviation. Based upon the noise level estimation process 550 the smoothing level selection 552 may use a set of look up tables and/or a set of noise level thresholds 554 to select a smoothing level. For example, if the measured noise level is in a pre-defined range, then the smoothing level may be set to a pre-defined level. The look-up table and/or the input-output relationship may be determined based upon image training for improved system performance. For example, the smoothing level may correspond directly to one of the smoothing filter parameters. For example, the smoothing filter may be any suitable filter, such as a uniform filter, a Gaussian filter, or a Bilateral filter. In the case of a uniform filter, the smoothing level may correspond to the number of taps or window size of the filter. In the case of a Gaussian filter, the smoothing level may be selected based upon a Gaussian sigma parameter. In the case of a bilateral filter, the spatial Gaussian sigma parameter may be set to a fixed value based upon a fixed window size, while the range of the Gaussian sigma parameter is varied based upon the noise level. For example, the greater the standard deviation the greater the noise level, thus the greater amount of smoothing that may be applied.

In many environments, the object is non-uniformly illuminated by one or more light sources. The captured images of the object tend to have specular reflection since many objects are dielectrically inhomogeneous, thus having both diffuse and specular properties. When a set of light rays enters an inhomogeneous opaque surface, some of the rays immediately reflect back into the air, while other rays penetrate the object body. Some of the penetrating rays go through the body, while others reflect back through the initial surface. The immediately reflected rays are generally referred to as specular reflections, while rays that have penetrated and are then reflected back are generally referred to as diffuse reflections. Depending on the object and the position of one or more light sources, the specular reflection may dominate while appearing as one or more bright "spots" in the image generally referred to as specular highlight. Specular highlight alters the appearance of the image, such as for example, creating the appearance of non-existent artificial edges which could result in the subsequent object matching failing. Accordingly, it is desirable to identify and reduce the specular highlights so that subsequent object matching is improved.

To improve on the computational efficiency of the system, it is preferable to suppress the effects of specular highlights by using a single grey-level image. By using a single image, the complexities associated with multiple images are reduced, and by using a grey-level image the complexities associated with color images are likewise reduced. Based upon the single grey-level image, the artificial edges created as a result of specular highlights are identified and removed based upon heuristics of the intensity distribution of the highlight pixels. Bright regions where the intensity is greater than a threshold level are more likely to correspond with a specular highlight than other regions. However, pixels with a high gradient magnitude indicative of an actual edge which also have a high intensity will likely be removed if only using the threshold level. Accordingly, a constraint may be included such that only those pixels with a sufficiently high intensity and a sufficiently low gradient magnitude should be identified as specular highlights.

Figure 21:
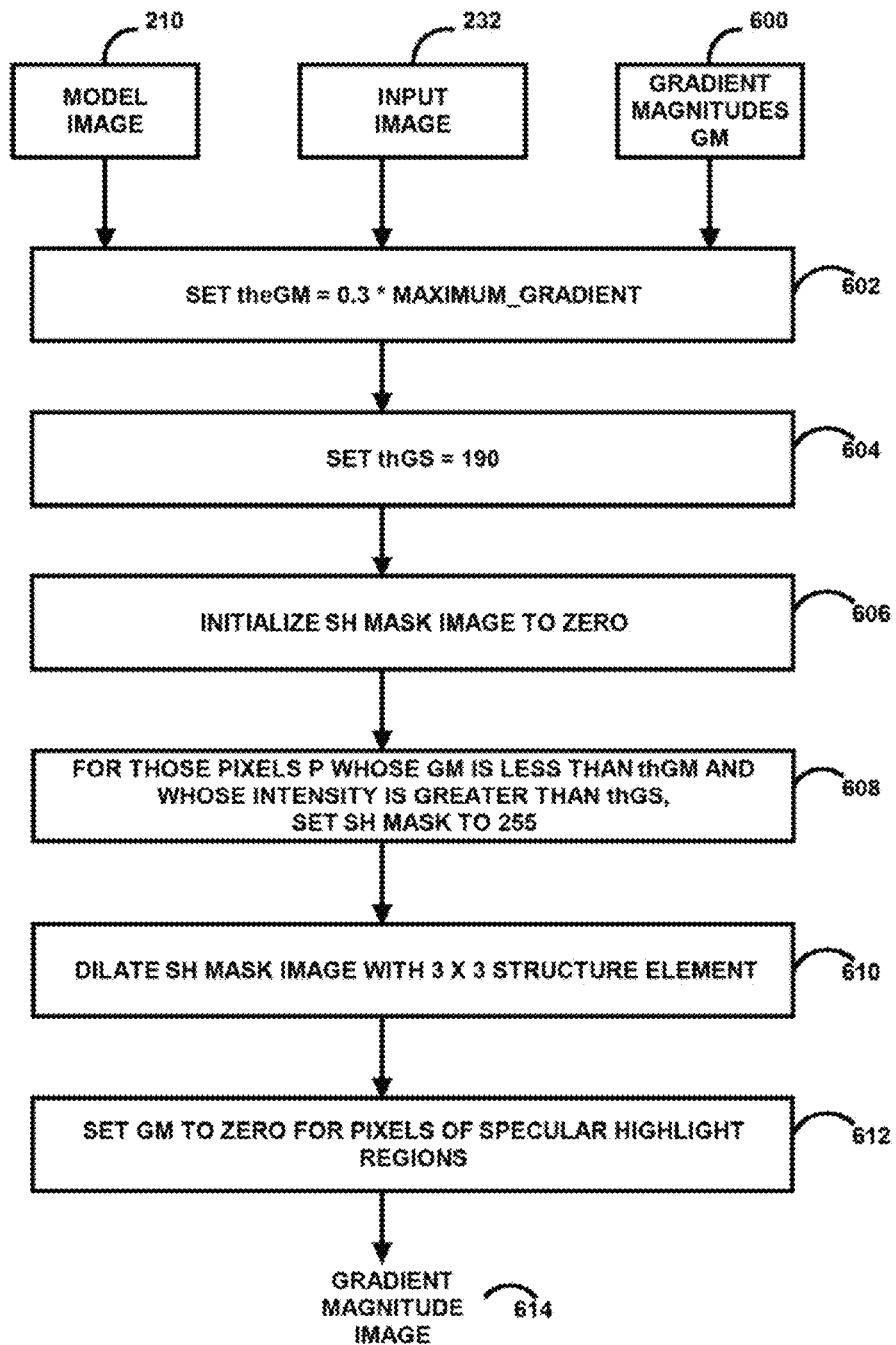
FIG. 21 illustrates a technique to reduce specular highlights.

Referring to FIG. 21, one exemplary technique to reduce the effects of specular highlights is shown. The technique receives a set of inputs including, the model image 210, the input image 232, and the gradient magnitudes "GM" 600 (e.g., edge related information) of the input image 210. A variable "thGM" relating to a gradient magnitude may be set to a threshold value 602, such as 0.3*Maximum_Gradient of the gradient magnitudes 600. A variable "thGS" relating to a grey scale magnitude may be set to a threshold value 604, such as a value of 190. A mask image "SH" may be initialized to zero 606. A comparison 608 may be performed for those pixels p where its corresponding GM is less than thGM and whose intensity is greater than thGS, then the SH mask may be set to a value such as 255. Accordingly, the pixels satisfying these conditions may be represented as a binary mask corresponding to the specular highlight regions. The specular highlight map SH may be dilated by a 3×3 structure element 610 or other suitable manner. The dilation process tends to enlarge the detected specular highlight region for more effective specular highlight identification. In the gradient magnitude image 600 of the input image 232 for those pixels detected as specular highlights are set to zero 612. The result is an improved gradient magnitude image 614 with the regions corresponding to specular highlight being reduced.

Figure 22:
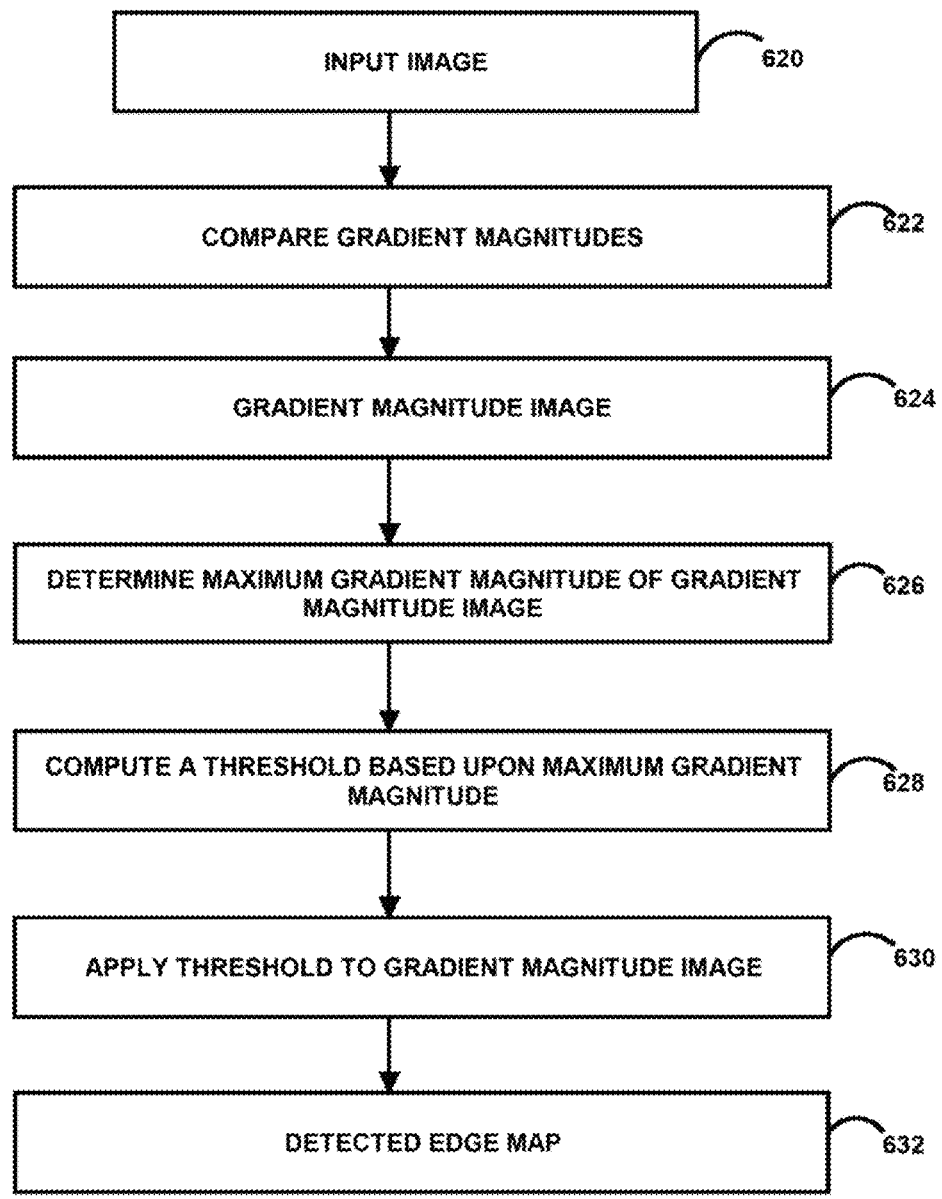
FIG. 22 illustrates an edge based globally adaptive threshold.

The object matching technique may be improved by modification of the edge detection process 216/236 to be adaptive to the image content. In particular, the edge detection process 216/236 may be adaptive to the global image content and/or local image content. Referring to FIG. 22, a global image content based edge detection process may include receiving an input image 620 and computing gradient magnitudes 622 of the input image 620, such as using a sobel filter. The resulting gradient magnitudes 622 may be represented as a gradient magnitude image 624. A maximum gradient magnitude 626 may be determined for the gradient magnitude image 624. A threshold 628 may be computed based upon the maximum gradient magnitude 626, such as 0.15*Maximum_Gradient_Threshold. The threshold 628 is applied 630 to the gradient magnitude image 624 to determine a detected edge map 632.

Figure 23:
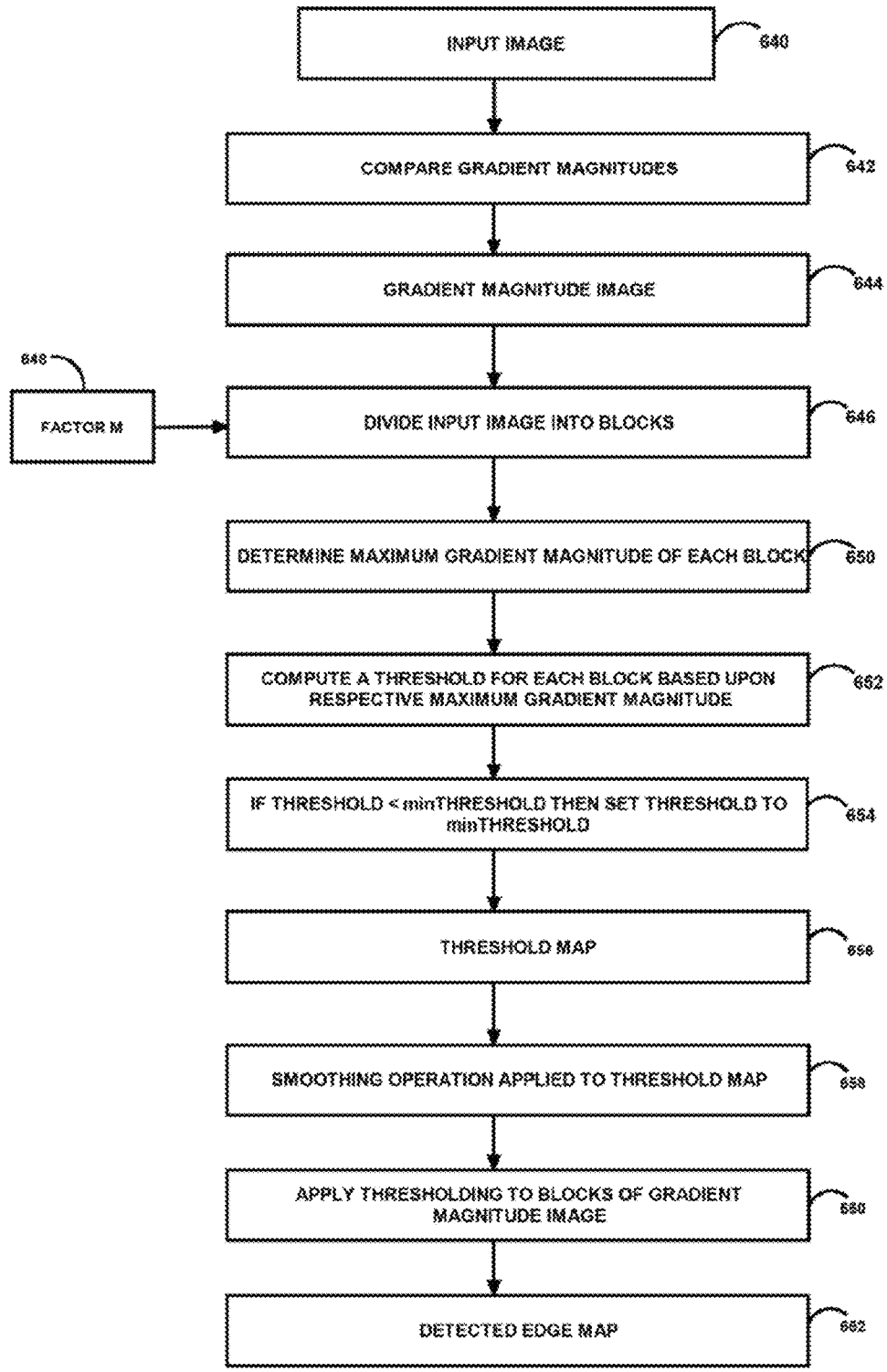
FIG. 23 illustrates an edge based locally adaptive threshold.

The object matching technique may be improved by modification of the edge detection process 216/236 to be adaptive to the local image content. Referring to FIG. 23, a local image content based edge detection process may include receiving an input image 640 and computing gradient magnitudes 642 of the input image 640, such as using a sobel filter. The resulting gradient magnitudes 642 may be represented as a gradient magnitude image 644. The input image 640 (and/or gradient magnitude image 644) may be divided into blocks 646, such as M×M blocks based upon a factor M 648. For example, the factor M 648 may be 16. A maximum gradient magnitude 650 may be determined for each of the blocks 646 in the gradient magnitude image 644. A threshold 652 may be computed for each block 646 based upon the maximum gradient magnitude for each block 650, such as 0.15*Maximum_Gradient_Magnitude. If one of the respective thresholds 652 for each block 646 is less than a minimum non-zero threshold 654, then the respective threshold is set to the minimum non-zero threshold 654 (or other suitable value). Using a minimum threshold value tends to reduce the effects of noise. The result of the threshold 654 is a threshold map 656, such as a M×M threshold map. A smoothing operation 658 may be applied to the threshold map 656, such as a Gaussian based operation, to reduce the differences between adjacent blocks. The smoothing operation 658 also reduces outliers which improves the object matching process. The result of the smoothing operation 658 is applied in a block-by-block thresholding step 660 to the respective blocks 646 of the gradient magnitude image 644 to determine a locally adaptive detected edge map 662.

Figure 24:
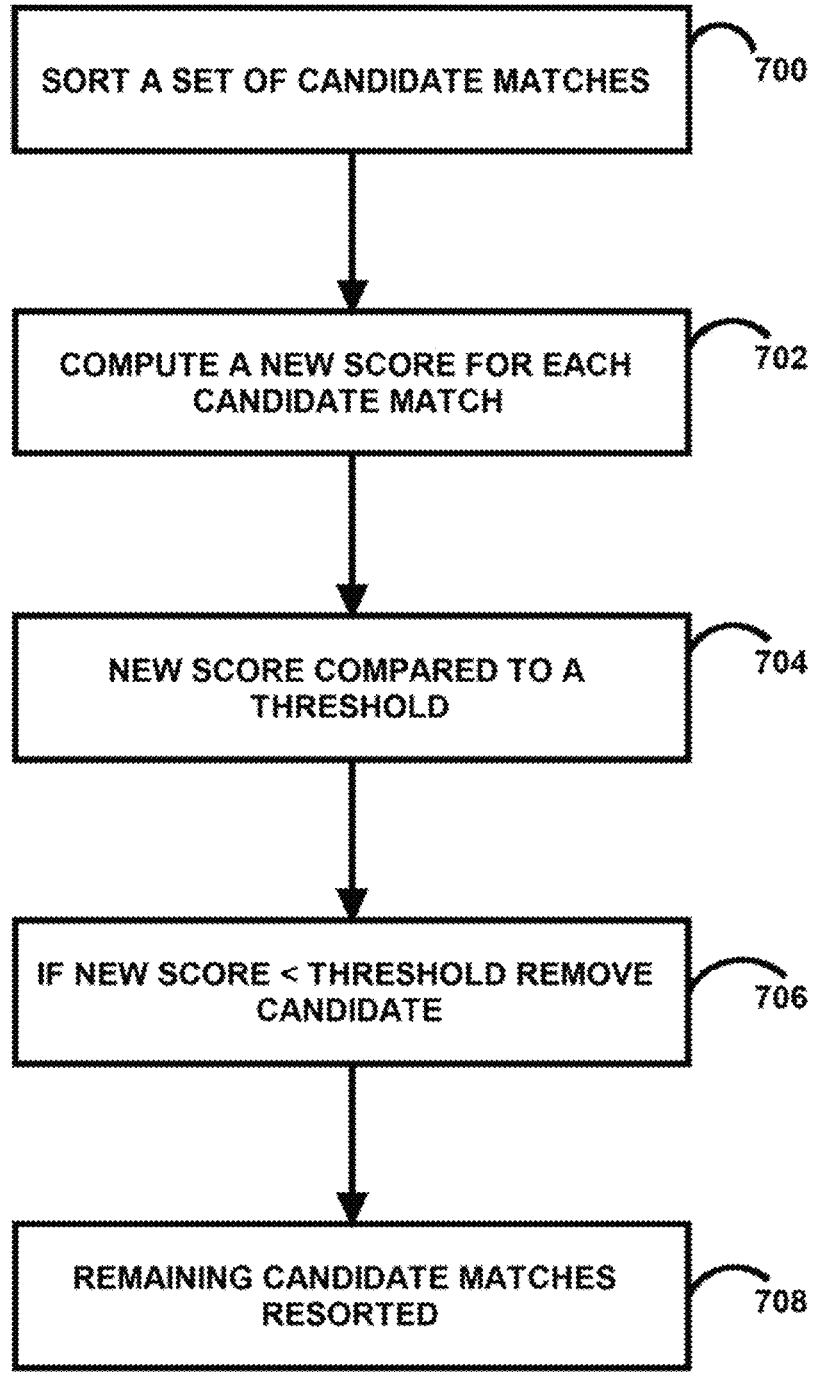
FIG. 24 illustrates a new scoring process.

The object matching process includes the identification of a set of potential matching objects including their position and/or orientation within the input image. In many situations, a single matching score may not correspond with a true match. In order to increase the effectiveness of the matching process, an additional scoring process may be used to select among a set of potential matches. For example, the additional sorting process may be included after the refining object process 256 shown in FIG. 11. As a general matter the process illustrated in FIG. 11 tends to be good at finding objects and its location but likewise tends to have excessive false positives. Also, the technique tends to have matching scores that are not sufficiently correlated to whether a correct object has been determined. Referring to FIG. 24, a set of candidate matches are sorted in a suitable order 700, such as a descending order based upon their matching score. A new score may be computed for each of the candidate matches 702. The new scores may be compared to a threshold 704. If the match has a score lower than the threshold, then the match is removed from the candidate matches 706. The remaining candidate matches are resorted based upon the new scores 708. The new score is a different matching technique, preferably with a more perceptual based match scoring technique.

Figure 25:
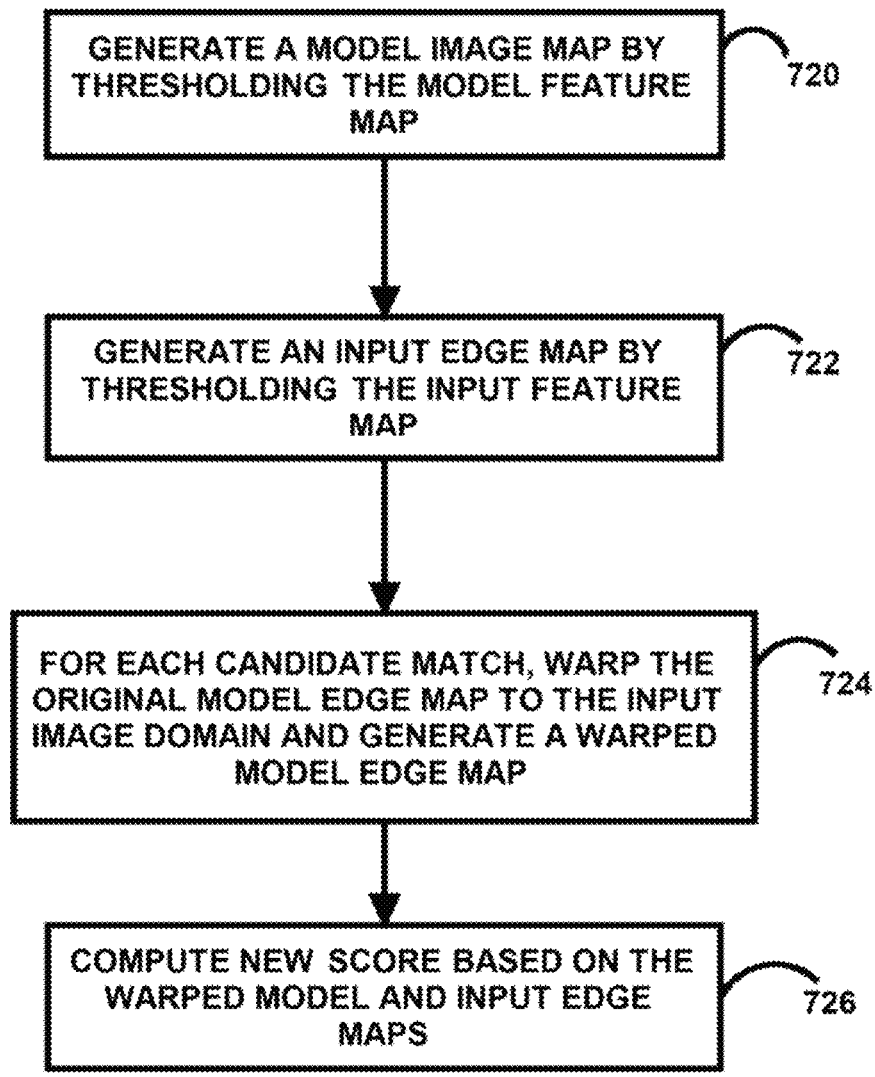
FIG. 25 illustrates a new scoring technique.

Referring to FIG. 25, the new score 702 may be computed in any suitable manner. One technique to compute the new score 702 is to generate a model image map by thresholding the model feature map. The technique also involves generating an input edge map by thresholding the input feature map 722. The model feature map and/or the input feature map may be non-binary. The model image map and/or input edge map may be binary. Accordingly, a thresholded set of characteristics are determined based upon the features of both the model image and/or the input image. A model region of interest mask may define a region of the input edge map to be used, thus removing noise and objects from skewing the results. For each candidate match, the original model edge map may be warped to the input image domain to generate a warped model edge map 724. The new score may be computed based on the warped model and the input edge maps 726.

The new score function may be any suitable calculation, as desired. For example, as the original gradient feature matching score function may be computed between the feature block images, the new score may be computed based upon the gradient edge maps. The model gradient map may be represented by EDGEm, whereas the input gradient map is EDGEi. The novel score function may be one of the following:

(1) A normalized gradient feature matching score. The original gradient feature matching score is normalized by the number of edge pixels in the model and input gradient edge maps, $$\frac{GFM}{\sqrt{|EDGEm|*|EDGEi|}}.$$

(2) A subtracted GFM score. The original GFM score is added to the number of edge pixels in the model image and subtracted by that in the input image, GFM+|EDGEm|−|EDGEi|.

(3) An edge normalized cross correlation (NCC) score. The NCC score is computed between the corresponding edge pixels in the model and input images; NCC(EDGEm, EDGEi).

(4) A combined GFM and NCC score. The multiplication of the GFM and NCC scores; GFM*NCC(EDGEm,EDGEi).

As previously described, the estimation of the size and/or scale of an object 260 (see FIG. 12) in the image may be selected among a discrete set of pre-determined scales. For example, the pre-determined set of scale factors may include the values {0.5, 0.6, 0.7, 0.8, 0.9, 1.0, 1.2, 1.4, 1.6, 1.8, 2.0}. However, the actual size of the object in the input image may be any scale factor relative to the model object size. For example, the actual scale factor may be any value in the continuous interval between 0.5 and 2.0. Accordingly, the technique to estimate the scale factor of the input image should be as precise as desired, especially improving the precision of the scale factor based upon an initial rough initial estimate. For example, if the scale factor among a set of discrete values is determined to be 1.4, the technique may further refine the scale factor more precisely, such as between a range of 1.2 and 1.6.

The scaling factor may be based upon spatial characteristics of the model image and the spatial characteristics of the input image. For example, an estimate of the size of a two-dimensional object in the image may be based upon an average distance of the pixels in the object to the center of the object. The size may be measured in both the model image and in the input image. A scale factor may be based upon the relative size of the model image and the input image, such as the ratio of the two average distance measurements. While any spatial measurement maybe used, the average distance measure is generally noise resistant.

Figure 26:
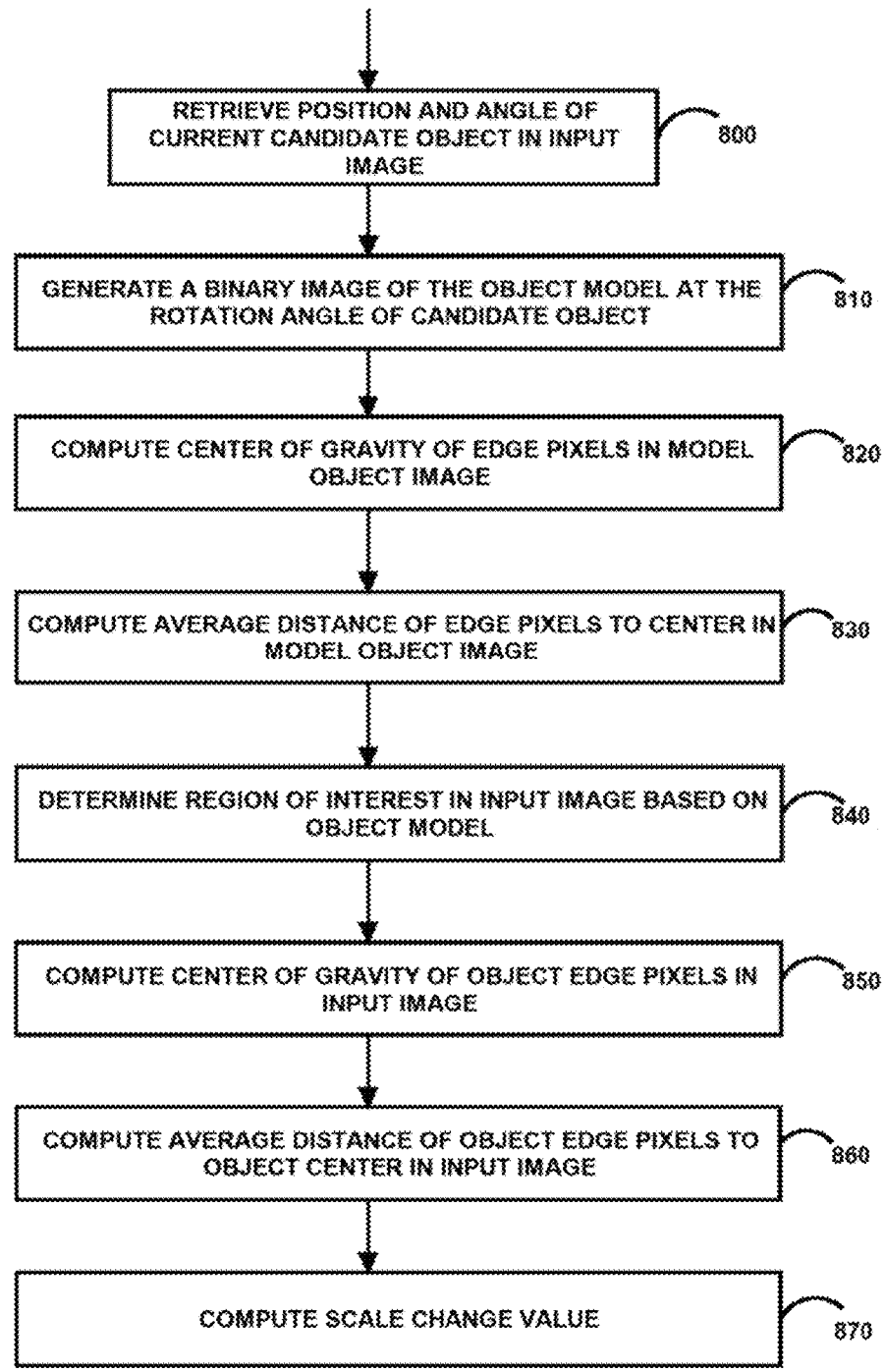
FIG. 26 illustrates a technique for scale estimation.

Referring to FIG. 26, one technique to compute spatial characteristics of the model object and/or the input image includes the system retrieving the position and angle of the candidate object 800 in the input image. The system may compute a binary image of the object model at the rotation angle of the candidate object in the input image 810. The system may compute a reference point in the model object.

The reference point may be the center of gravity $X_c^M$, i.e. the average position of the model edge pixels 820.

The system may then compute a spatial characteristic of the model object, based on the distances of all the edge pixels in the model image to the reference point 830. For example, the measurement may be the mean absolute distance of the edge pixels, such as:

$$D_M = \frac{1}{N_M} \sum_i d_i^M = \frac{1}{N_M} \sum_i \|X_i^M - X_c^M\|,$$

where $X_i^M$ is the position of the i-th edge pixel, the average is computed over all the edge pixels, and $N_M$ is the number of edge pixels in the model image.

The system may determine a region of interest (ROI) in the input image based upon the object model 840. The ROI may include the edge pixels corresponding to the object model and excludes edge pixels due to other objects. The ROI may be determined based upon an approximate position and rotation of the object in the input image 800. Given the ROI, the edge pixels corresponding to the object in the input image may be determined.

A similar spatial characteristic may be determined for the input image based upon the center of gravity and the edge pixels of the input image. This may be performed using an input image that is scaled to one of the scale factors. The system may compute the center of gravity $X_c^i$, i.e. average position, of the object edge pixels in the input image 850.

The system may determine a spatial characteristic of the input image based on the distances of all edge pixels in the input image to the center of gravity 860. For example, the spatial characteristic may be the mean absolute distance of the edge pixels, as follows, $$D_I = \frac{1}{N_I} \sum_i d_i^I = \frac{1}{N_I} \sum_i \|X_i^I - X_c^I\|$$

where $X_i^I$ is the position of the i-th edge pixel, the average is computed over all edge pixels in the object ROI, and $N_I$ is the number of edge pixels inside the ROI in the input image.

The system may determine a relative scale factor between the object model and the object in the input image, such as based upon the ratio of the size measurements, $$\text{scale} = \frac{D_I}{D_M} \mathbf{870}.$$

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

We claim:

1. A method for image processing comprising:
    (a) determining edge pixels of a model image;
    (b) determining features for said edge pixels of said model image;
    (c) determining edge pixels of an input image;
    (d) determining features for said edge pixels of said input image;
    (e) matching said features of said model image with said features of said input image to determine candidate locations of an object within said input image;
    (f) wherein said image processing further includes identifying specular highlights and:
        (i) identifying specular highlights by using a single grey level image and identifying regions of said single grey level image having both large intensities together with low edge strength;
        (ii) and at least one of (1) using an edge based technique in a manner that includes a locally adaptive threshold for at least one of said determining edge pixels of said model image using an edge based technique and said determining edge pixels of said input image and (2) scaling said input image to a plurality of different scales for matching said model image with said input image to determine said candidate locations of said object within said input image and determining a scaling factor based upon spatial characteristics of at least one of said input image and said model image; and
    (g) modifying at least one edge of said input image based on the identified said specular highlights.

2. The method of claim 1 wherein said image processing further includes pre-processing said model image based upon the content of said model image to select a model image down sampling factor, and down sampling said model image based upon said model image down sampling factor.

3. The method of claim 1 wherein said input image down sampling factor is used to down samples said input image to a greater extent the lower the frequency content of said input image.

4. The method of claim 2 wherein said input image down sampling factor is used to down samples said input image to a greater extent the lower the frequency content of said input image, and wherein said model image down sampling factor is used to down samples said model image to a greater extent the lower the frequency content of said model image.

5. The method of claim 2 wherein said content of said model image includes the size of said model image.

6. The method of claim 2 wherein said content of said model image includes a measure of the auto-correlation of said model image.

7. The method of claim 6 wherein said content of said model image is a measure of said auto-correlation together with a smoothing filter.

8. The method of claim 7 wherein said content of said model image is a measure of another auto-correlation together with another smoothing filter.

9. The method of claim 2 wherein said pre-processing further includes suppressing said at least one edge using a smoothing filter subsequent to said down sampling.

10. The method of claim 9 wherein said smoothing filter is based upon a noise level estimation and said at least one edge is suppressed based on the identified said specular highlights.

11. The method of claim 10 wherein said noise level estimation is different for different regions of said input image.

12. The method of claim 1 wherein said identifying specular highlights is further based upon a dilation operation.

13. The method of claim 1 wherein said determining said edge pixels of at least one of said model image and said input image includes locally adaptive threshold.

14. The method of claim 13 wherein said locally adaptive threshold have a non-zero minimum threshold.

15. The method of claim 1 wherein said refining said candidate locations using said another matching is based upon comparing edge maps.

16. The method of claim 15 wherein said edge maps are binary.

17. The method of claim 1 wherein said spatial characteristics includes a center of a portion of said input image.

18. The method of claim 17 wherein said spatial characteristics includes a spatial measure of the distance of pixels in the object to said center.

19. A method for image processing comprising:
(a) determining edge pixels of a model image;
(b) determining features for said edge pixels of said model image;
(c) determining edge pixels of an input image;
(d) determining features for said edge pixels of said input image;
(e) matching said features of said model image with said features of said input image to determine candidate locations of an object within said input image;
(f) wherein said image processing further includes identifying specular highlights and at least one of:
 (i) identifying specular highlights by using a single grey level image and identifying regions of said single grey level image having both large intensities together with low edge strength;
 (ii) using an edge based technique in a manner that includes a locally adaptive threshold for at least one of said determining edge pixels of said model image using an edge based technique and said determining edge pixels of said input image;
 (iii) scaling said input image to a plurality of different scales for matching said model image with said input image to determine said candidate locations of said object within said input image and determining a scaling factor based upon spatial characteristics of at least one of said input image and said model image;
(g) modifying at least one edge of said input image based on the identified said specular highlights;
(h) wherein said image processing includes identifying specular highlights by using a single grey level image and identifying regions of said single grey level image having both large intensities together with low edge strength.

20. The method of claim 1 wherein said edge based technique is in a manner that includes a locally adaptive threshold for at least one of said determining edge pixels of said model image using an edge based technique and said determining edge pixels of said input image.

21. The method of claim 1 further comprising refining said matching associated with said candidate locations using another matching function to select among a plurality of said candidate locations.

22. The method of claim 1 further comprising scaling said input image to a plurality of different scales for matching said model image with said input image to determine said candidate locations of said object within said input image and determining a scaling factor based upon spatial characteristics of at least one of said input image and said model image.

* * * * *